United States Patent
Okazaki et al.

(10) Patent No.: US 6,604,082 B1
(45) Date of Patent: Aug. 5, 2003

(54) VOICE RECORDING/REPRODUCING APPARATUS

(75) Inventors: Makoto Okazaki, Hino (JP); Hiroaki Miura, Hachioji (JP); Yuichi Tomii, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/518,881

(22) Filed: Mar. 6, 2000

(30) Foreign Application Priority Data

Mar. 9, 1999 (JP) ............................................ 11-061494
Mar. 9, 1999 (JP) ............................................ 11-062071
Mar. 10, 1999 (JP) ........................................... 11-063636

(51) Int. Cl.[7] ............................................ G06F 17/60
(52) U.S. Cl. ................................. 705/8; 345/963; 705/1
(58) Field of Search ..................... 705/1, 8, 9; 345/963; 368/28; 704/200; 708/110, 111, 112, 134

(56) References Cited

U.S. PATENT DOCUMENTS

| | | | | |
|---|---|---|---|---|
| 5,253,121 A | * | 10/1993 | Asano | 360/72.1 |
| 5,948,040 A | * | 9/1999 | DeLorme et al. | 340/990 |
| 6,009,398 A | * | 12/1999 | Mueller et al. | 704/275 |
| 6,088,026 A | * | 7/2000 | Williams | 707/500.1 |
| 6,167,376 A | * | 12/2000 | Ditzik | 704/231 |

FOREIGN PATENT DOCUMENTS

| | | | | |
|---|---|---|---|---|
| EP | 921670 A2 | * | 6/1999 | ............ H04M/3/42 |
| JP | 63-259700 | | 10/1988 | |
| JP | 6-336094 | | 12/1994 | |

OTHER PUBLICATIONS

GroupWise integrated email,scheduling and task management v4.1, 1994 Novell Corporation, p. 54, 129.*

* cited by examiner

*Primary Examiner*—James P. Trammell
*Assistant Examiner*—John Winter
(74) *Attorney, Agent, or Firm*—Frishauf, Holtz, Goodman & Chick, P.C.

(57) ABSTRACT

A voice recording/reproducing apparatus in accordance with the present invention includes a recording medium, a recording unit, a playback unit, and a reproduction manipulating unit. The recording unit records by voice the items of a schedule for each day on the recording medium. The playback unit reproduces by voice the items of a schedule for each day which are recorded on the recording medium. The playback manipulating unit is used to designate a day of a year for which a schedule must be played back, and to instruct the playback unit to play back the items of the schedule for the designated day. The recording unit can record a plurality of schedule items as the items of a schedule for each day. All the schedule items for the designated day are played back responsive to one manipulation performed on the playback manipulating unit.

9 Claims, 16 Drawing Sheets

VOICE RECORDING/REPRODUCING APPARATUS

BACKGROUND OF THE INVENTION

1. Field of the Invention

The present invention relates to a voice recording/reproducing apparatus, or more particularly, to a voice recording/reproducing apparatus for digitizing acoustic information and recording it on a recording medium.

2. Description of the Related Art

Digital information recording/reproducing apparatuses referred to as digital recorders have been developed in the past. The digital information recording/reproducing apparatus digitizes a voice signal picked by a microphone or the like, and records the resultant digital signal in, for example, a semiconductor memory. For playback, the voice signal is read from the semiconductor memory, and converted into an analog form. The resultant analog voice signal is then output in the form of voice from a loudspeaker. Japanese Unexamined Patent Publication No. 63-259700 has disclosed this sort of digital information recording/reproducing apparatus.

In recent years, voice recording/reproducing apparatuses having the ability to manage schedules in response to voice have been proposed. For example, Japanese Unexamined Patent Publication No. 6-336094 has disclosed a calendar apparatus including a display unit on which a calendar is displayed, and having the sound recording ability to record or play back a schedule for any day in the displayed calendar.

Moreover, Japanese Unexamined Patent Publication No. 6-336094 has disclosed a calendar with a sound recording ability. In the calendar with a sound recording ability, a schedule is input by voice in units of a day of a calendar, and recorded on a disk or the like. Signals representing input schedules for days are selectively reproduced by voice.

However, the recording/reproducing apparatus disclosed in Japanese Unexamined Patent Publication No. 6-336094 can record only one schedule item for each day. When a new schedule item is added to the recorded schedule for a day, schedule items that have already been recorded are deleted.

Attempts have been made to enable recording of a plurality of schedule items for each day in order to overcome the above drawback. According to related arts, for reproducing a plurality of schedule items for each day, a playback button must be pressed for each item. This leads to deteriorated user-friendliness.

The recording/reproducing apparatus that has been disclosed in Japanese Unexamined Patent Publication No. 6-336094 requires a large space to be occupied by the display unit because a calendar is displayed over the surface of the display unit. This causes an increase in the size of the apparatus itself. The apparatus is therefore unsuitable for portable use. The calendar alone is displayed on the display unit. At present, it is hard to readily learn for which day data (schedule items) representing a schedule has been recorded. If schedule items have been recorded, it is hard to readily learn how many items have been recorded.

There is an increasing demand for a portable recording apparatus with a schedule management ability these days. Since this sort of recording apparatus is being designed more and more compactly, the display unit is requested to have a smaller size.

Furthermore, conventional voice recording/reproducing apparatuses with a schedule management ability including the recording/reproducing apparatus disclosed in Japanese Unexamined Patent Publication No. 6-336094 have the number of schedule items indicated for each day on the display unit. However, the number of all schedule items that have already been input is not indicated. This poses a problem in that it is hard to grasp the whole of a schedule folder. Moreover, although there is an upper limit to the number of schedule items that can be input, the number of remaining schedule items that can be input is not indicated. It is therefore impossible to learn how many more schedule items can be input.

SUMMARY OF THE INVENTION

The first object of the present invention is to provide a voice recording/reproducing apparatus making it possible to record and exactly learn a plurality of schedule items.

The second object of the present invention is to provide a voice recording/reproducing apparatus making it possible to immediately learn recorded schedule items without the necessity of increasing the size of the apparatus.

The third object of the present invention is to provide a voice recording/reproducing apparatus with a scheduling ability making it possible to exactly grasp the states of sound files recorded as schedules using a limited display space.

Briefly, a voice recording/reproducing apparatus in accordance with the present invention comprises of a recording medium, a recording means, a playback means, and a playback manipulating means. The recording means records by voice the items of a schedule for each day on the recording medium. The playback means reproduces by voice the schedule items for each day recorded on the recording medium. The playback manipulating means is used to designate a day of a year for which a schedule must be played back and to instruct the reproducing means to play back the schedule items for the designated day. The recording means can record a plurality of schedule items for each day. All the schedule items for the designated day are played back responsive to one manipulation performed on the playback manipulating means.

These objects of the present invention and the advantages thereof will be further apparent from the detailed explanation given below.

DESCRIPTION OF THE PREFERRED EMBODIMENTS

Figure 1:
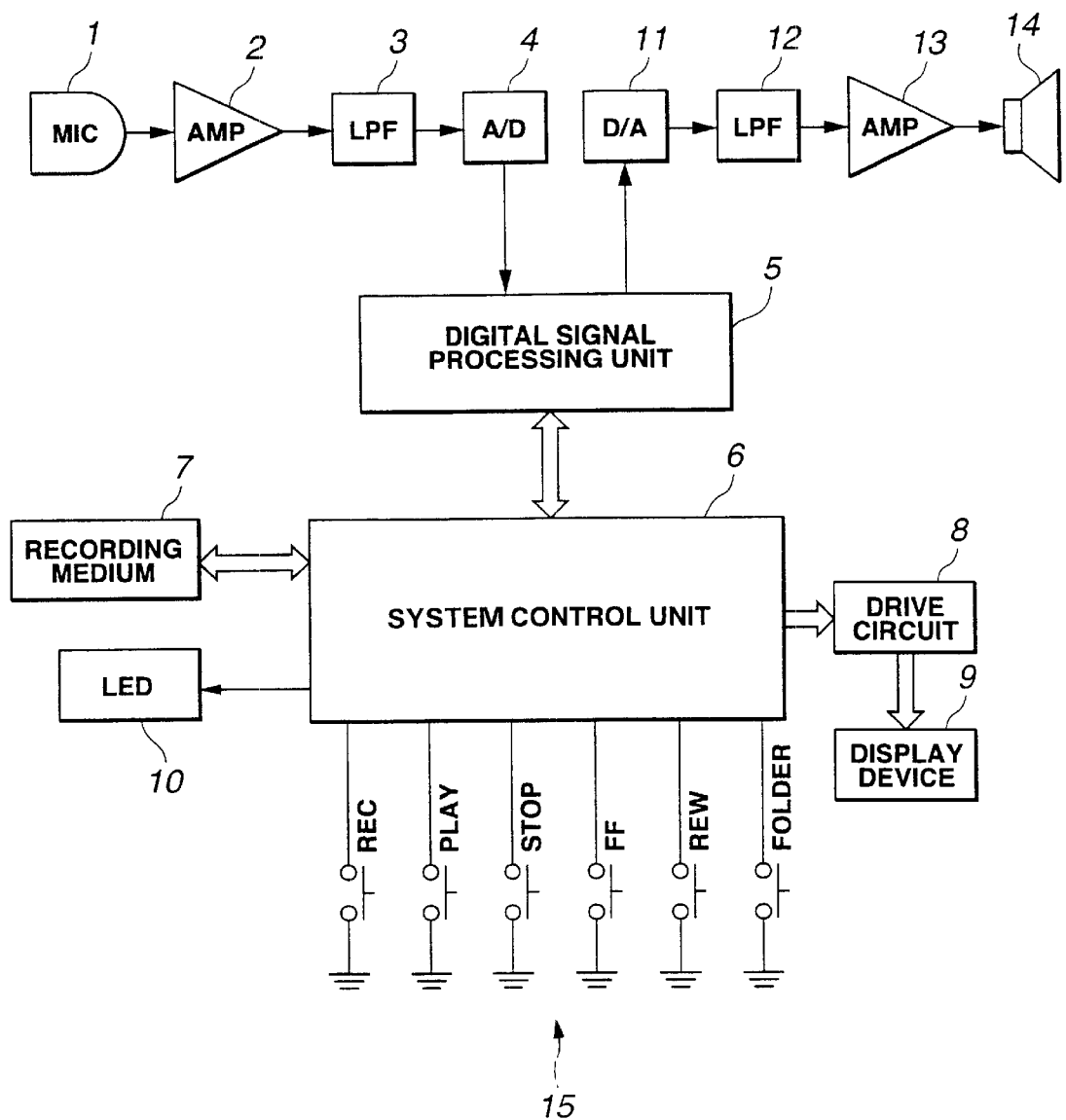
FIG. 1 is a block circuit diagram showing the configuration of a voice recording/reproducing apparatus in accordance with the first embodiment of the present invention.

Referring to the drawings, embodiments of the present invention will be described below.

FIG. 1 is a block circuit diagram showing the configuration of a voice recording/reproducing apparatus in accordance with the first embodiment of the present invention.

The voice recording/reproducing apparatus in accordance with the first embodiment has a microphone 1 for converting voice into an electric signal. A microphone amplifier 2 amplifies a voice output from the microphone 1. An output of the microphone amplifier 2 is input to an A/D converter 4 via a low-pass filter 3. Specifically, an analog voice signal amplified by the microphone amplifier 2 has unnecessary frequency components thereof cut by the low-pass filter 3. This is intended to prevent occurrence of an aliasing. The analog voice signal is then input to the A/D converter 4. The A/D converter 4 digitizes the analog voice signal. The resultant digital voice signal is input to a digital signal processing unit 5.

A control circuit, which is not shown, for controlling the action of the digital signal processing unit 5 is connected to the digital signal processing unit 5. Moreover, a data input/output buffer in which encoded data is temporarily stored is connected to the digital signal processing unit 5. The control circuit is connected to a system control unit 6 to be described later and controlled thereby.

For recording, the digital signal processing unit 5 compresses (encodes) the voice signal, which has been digitized by the A/D converter 4, in units of a frame under the control of the signal control unit 6. The digital signal processing unit 5 thus produces data formatted according to certain rules. The encoded data is temporarily stored in the data input/output buffer, and then transmitted to the system control unit 6. In contrast, for play back, the digital signal processing unit 5 decompresses (decodes) data sent from the system control unit 6 in units of a frame under the control of the system control unit 6. The resultant decoded digital signal is input to a D/A converter 11.

The voice signal converted into an analog form by the D/A converter 11 is input to a power amplifier 13 via a low-pass filter 12. The power amplifier 13 amplifies the voice signal and drives a loudspeaker. The low-pass filter 12 cuts unnecessary frequency components so as to alleviate a quantized noise. The voice signal amplified by the power amplifier 13 is made audible by the loudspeaker 14.

An LED 10 is connected to the system control unit 6. The LED 10 presents various signs employed in the voice recording/reproducing apparatus to a user. Glowing or flickering of the LED 10 is controlled directly by the system control unit 6.

The system control unit 6 is realized with a microprocessor or a so-called CPU. According to the first embodiment, the system control unit 6 controls the actions of the components of the voice recording/reproducing apparatus. The system control unit 6 fills the role of a recording means for recording schedules for days on a recording medium (memory card) 7 to be described. The system control unit 6 also fills the role of a reproducing means capable of reproducing by voice the items of a schedule for each day recorded on the recording medium 7.

The system control unit 6 can record a plurality of schedule items as the items of a schedule for each day on the recording medium 7. When a playback button Play is pressed once, the system control unit 6 gives control to play back all the schedule items for a designated day.

The recording medium 7, for example, a flash memory card is connected to the system control unit 6 via a memory card control unit. The flash memory card 7 can be loaded or unloaded into or from the voice recording/reproducing apparatus. The recording medium 7 has a voice or sound data field and an index information field defined thereon. Predetermined voice data is recorded in the voice or sound data field, and index information relevant to the voice data is recorded in the index information field.

The memory card 7 has a switch used to designate the type of memory (whether or not the memory card 7 acts as a read-only card), and a switch used to inhibit or not to inhibit writing. When the flash memory card is loaded into the voice recording/reproducing apparatus, the system control unit 6 uses a memory card control unit to detect the states of the switches.

An address control circuit that is not shown is connected to the system control unit 6. An appropriate address signal is sent to the address control circuit according to a manipulation performed on an operator unit 15. Based on the address signal, voice data supplied from the digital signal processing unit 5 as well as a date of recording and index information are recorded on the flash memory card 7 according to a predetermined format. Alternatively, data recorded on the flash memory card 7 is read and supplied to the digital signal processing unit 5.

An LCD display device 9 on which various information concerning the voice recording/reproducing apparatus is indicated is connected to the system control unit 6 via a drive circuit 8. The LCD display device 9 indicates information relevant to each operation mode, day information, and presence or absence of a sound file relevant to a day or the number of files relevant to a day.

As mentioned above, a group of operator buttons 15 is connected to the system control unit 6. The group of operator buttons 15 includes various operator buttons such as a record button REC, a playback button PLAY, a stop button STOP, a fast feed button FF, a fast rewind button REW, and a folder selection button FOLDER.

Among the operator buttons, the play back button works as an ordinary switch used to play back a schedule. The playback button also works as a playback manipulating means used to designate a day for which a schedule must be played back and instruct the reproducing means to play back the contents of the schedule for the designated day. The fast feed button and fast rewind button work as switches used to execute ordinary fast feed and fast rewind operations respectively. The fast feed button and fast rewind button also work as day designating means used to designate a day relevant to a schedule. The folder selection button works as a folder designating means used to designate one of a plurality of folders to be described later.

Assume that a user wants to record the items (contents) of a schedule for a predetermined day together with the predetermined day or play back the items of the schedule. The user presses the folder selection button to select a dedicated folder. The user further presses the fast feed button and fast rewind button to designate a desired day of a year. Thereafter, the user presses the record button or playback button to record or play back the schedule items.

For recording a plurality of schedule items as the items of a schedule for the same date, the above recording procedure is repeated. Consequently, the schedule items are recorded as voice files bearing the same day information in the dedicated folder.

The system control unit 6 controls, aside from the action of the digital signal processing unit 5, the action of the memory card 7 according to the presses of operator buttons included in the group of operator buttons 15. For recording a voice signal responsive to a press of the record button, voice data supplied from the digital signal processing unit 5 is fed to the memory card 7 and recorded thereon according to a predetermined format. For playing back a predetermined voice sound responsive to a press of the playback button, the system control unit 6 receives data read from the flash memory card 7 and supplies the data to the digital signal processing unit 5.

Figure 2:
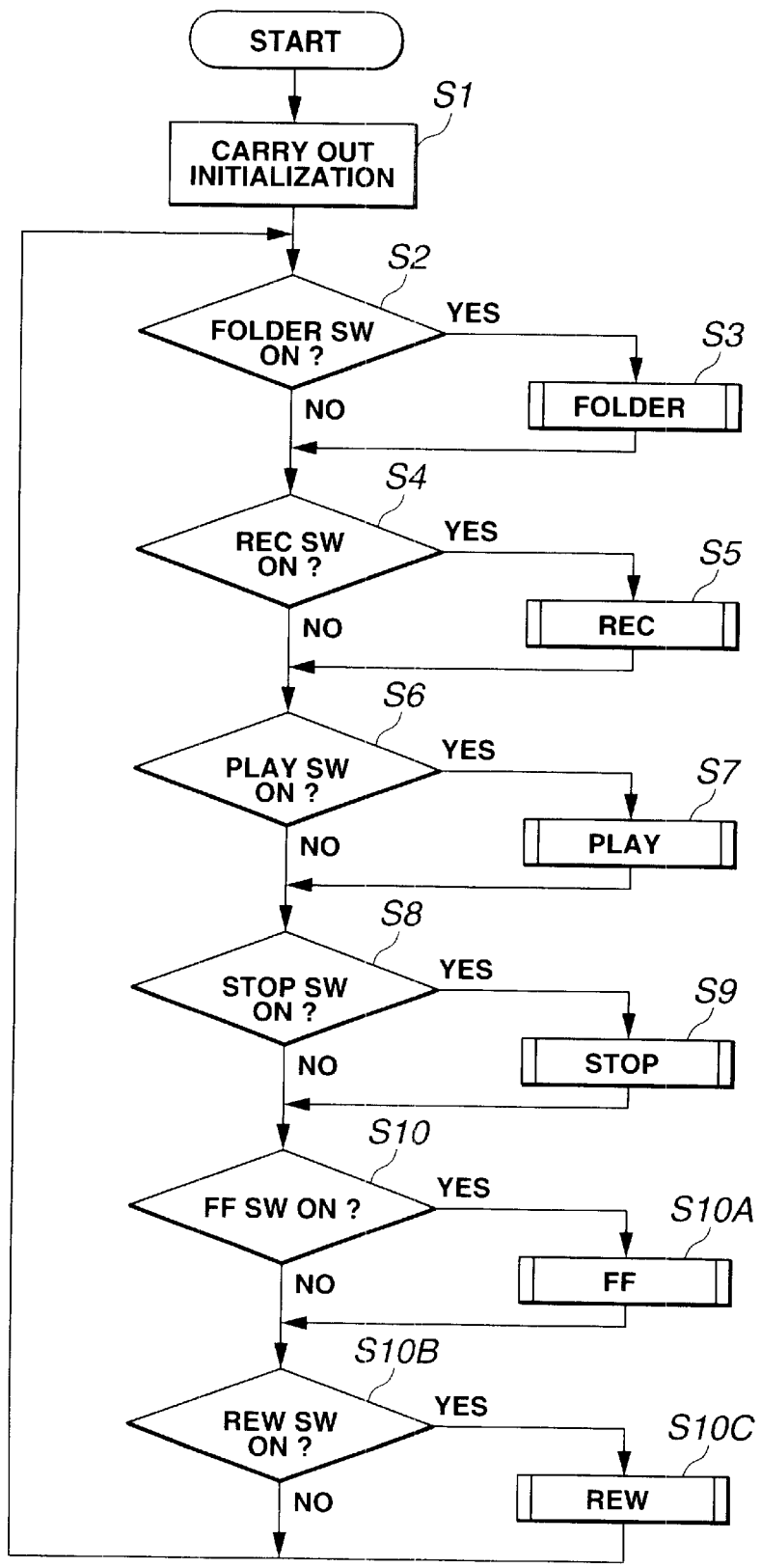
FIG. 2 is a flowchart describing a main processing sequence to be performed in the voice recording/reproducing apparatus in accordance with the first embodiment.
Figure 3:
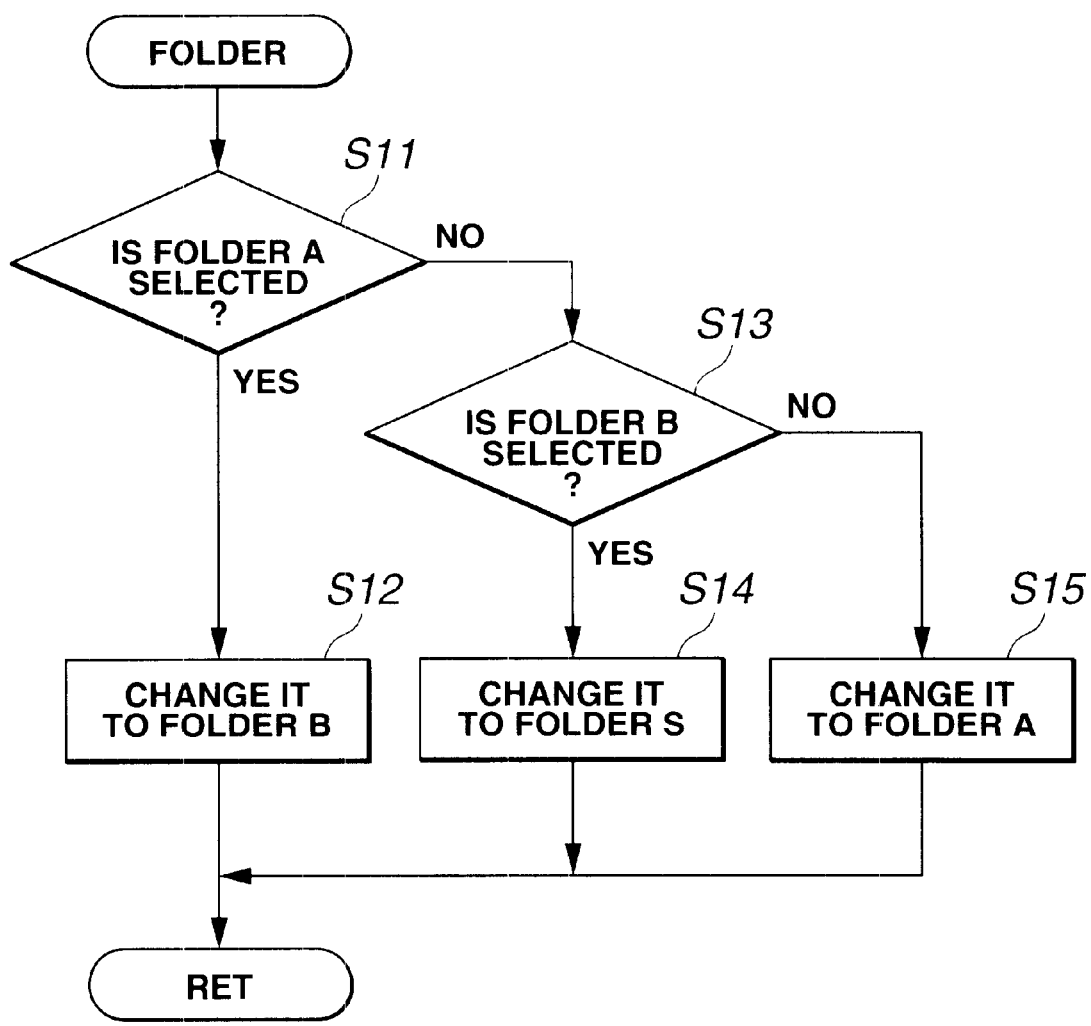
FIG. 3 is a flowchart describing subroutine Folder to be run in the voice recording/reproducing apparatus in accordance with the first embodiment.
Figure 4:
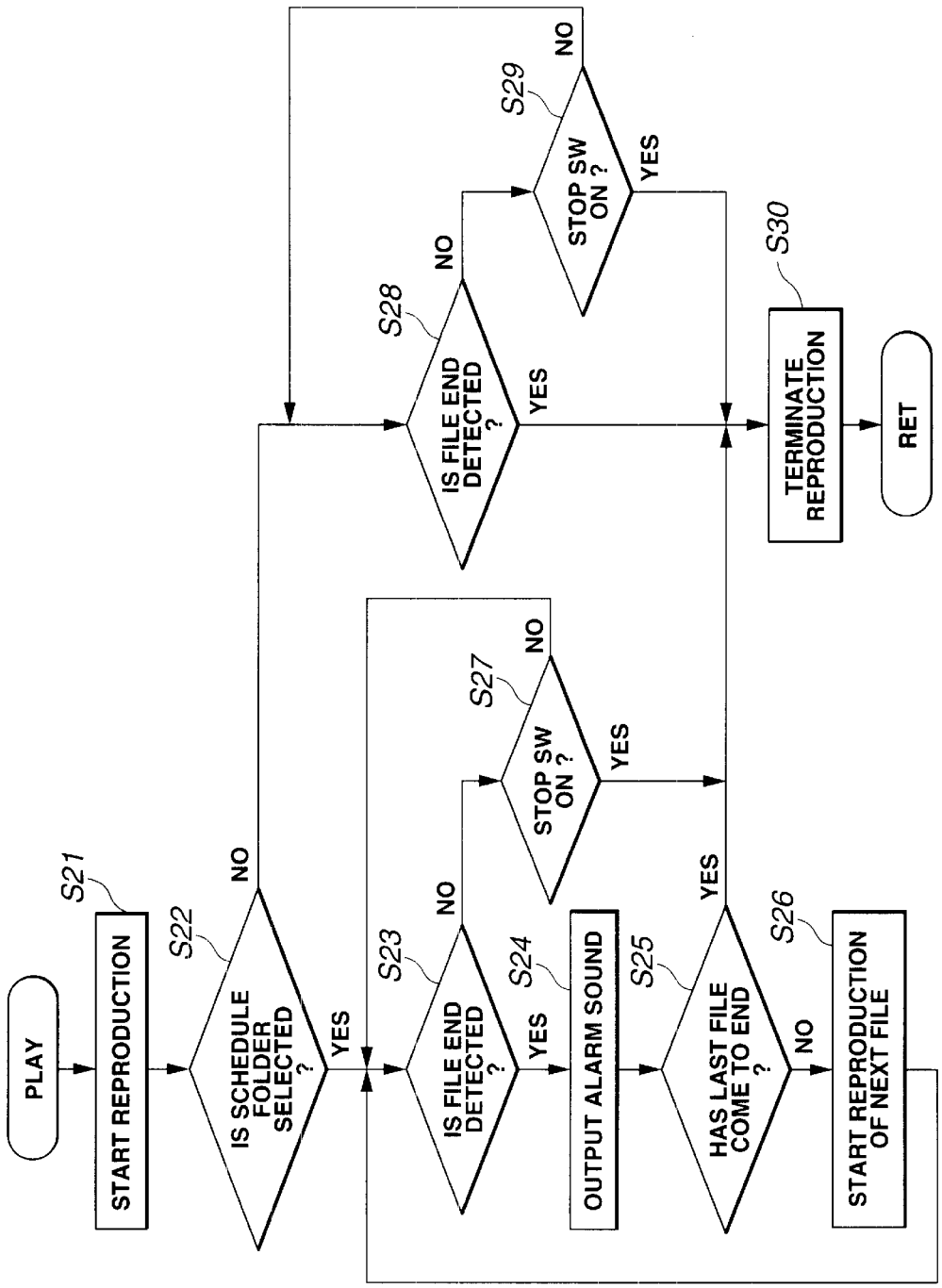
FIG. 4 is a flowchart describing subroutine Reproduction to be run in the voice recording/reproducing apparatus in accordance with the first embodiment.

Next, actions to be performed in the voice recording/reproducing apparatus in accordance with the first embodiment will be described with reference to FIG. 2, FIG. 3, and FIG. 4. FIG. 2 is a flowchart describing a main processing sequence or a main routine to be run in the voice recording/reproducing apparatus in accordance with the first embodiment.

When the voice recording/reproducing apparatus is powered, the system control unit 6 carries out predetermined initialization as shown in FIG. 2 (step S1). Thereafter, the system control unit 6 judges whether the folder selection button 105 included in the group of operator buttons 15 has been turned on (step S2). If the folder selection button 105 has been turned on, subroutine Folder is run (step S3).

When subroutine Folder is called, the system control unit 6 selectively modifies each folder that is a set of sound data files.

Now, a description will be made of a folder to be employed in the voice recording/reproducing apparatus in accordance with the present invention.

In general, an operating system (OS) to be installed in a computer or the like manages a group of predetermined data items as one file according to information written in a so-called file allocation table (FAT). The Windows, MS-DOS, or UNIX systems released from Microsoft Corp. deal with a group of files having something to do with each other under the tree structure as a set referred to as a "folder" or "directory" for users' convenience.

According to a technology recently accepted in the field of digital information recording/reproducing apparatuses, mutually relevant items of voice data recorded for users' convenience are dealt with as one set and referred to as a "file" or "folder." For example, a technology has been proposed for grouping recorded voice data items into larger sets (in the present embodiment, into sets referred to as folders) in terms of relevant information, for example, day information of days for which the voice data items are recorded. Files or folders serving as sets of relevant data items are switched if necessary in order to record or reproduce data. Thus, relevant voice data items are properly grouped and processed.

In the voice recording/reproducing apparatus in accordance with the first embodiment, the folder selection button is pressed in order to designate a mode for selecting a folder that is a set of voice data items (herein, referred to as files) representing items of schedules. According to the present embodiment, the number of folders to be employed is three.

Two of the three folders shall be file management folders (folder A and folder B) to be selected arbitrarily by a user. The other folder shall be a folder dedicated to management of schedules (folder S).

Figure 7:
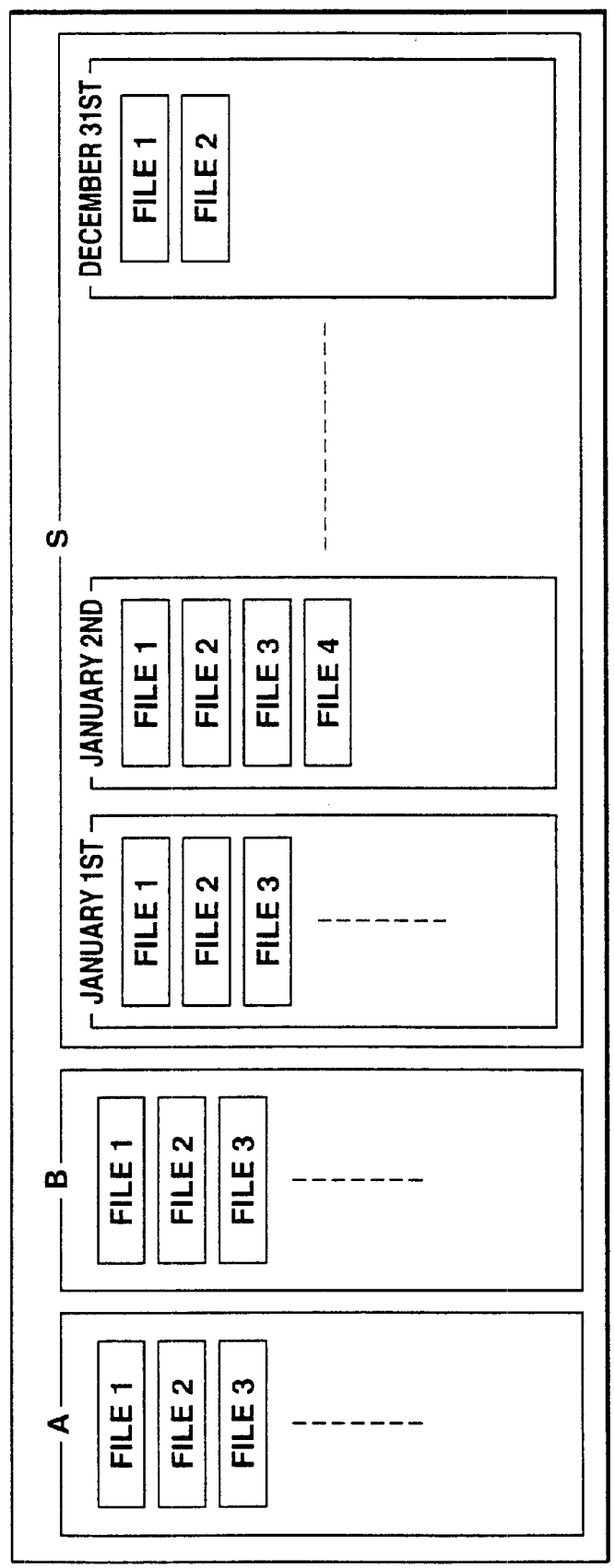
FIG. 7 is an explanatory diagram showing the file structure of each folder employed in the voice recording/reproducing apparatus in accordance with the first embodiment.

FIG. 7 shows a file structure adopted for the file management folders (folder A and folder B) and the dedicated schedule management folder (folder S) which are recorded on a recording medium.

As shown in FIG. 7, a plurality of sound files can be recorded as any of the folders. Especially, as folder S, a plurality of sound files (representing schedule items) can be recorded in relation to predetermined days of a year (as illustrated, January 1st, January 2nd, etc., to December 31st).

Referring back to FIG. 2, the system control unit 6 judges at step S2 whether the folder selection button has been pressed in order to select a folder change mode. If the system control unit 6 judges that the folder change mode has been selected, it runs the subroutine described in FIG. 3. The subroutine identifies a current folder and changes it to the next folder sequentially. More particularly, if the current folder is folder A (step S11), folder A is changed to folder B (step S12). If the current folder is folder B (step S13), folder B is changed to folder S (step S14). If the current folder is folder S, folder S is changed to folder A (step S15). The folders are changed in the order of folder A, folder B, folder S, and then folder A again. After folders are changed, control is returned to the main routine.

Referring to FIG. 2, if the folder selection button 105 has not been turned on at step S2, the system control unit 6 judges the state of the record button 102 (step S4). If the record button 102 has been turned on, subroutine Record is run (step S5).

At step S5, voice is recorded according to a technique generally adopted for this type of voice recording/reproducing apparatus. Voice data representing one item of a schedule to be recorded is stored as one sound file in a folder selected at that time. For example, as shown in FIG. 7, a plurality of sound files including the first file (file 1 in the drawing), the second file, etc. are recorded as one folder.

For recording an item of a schedule to be managed, a user selects schedule folder S from among the three folders in advance, and presses the fast feed button 106 and fast rewind button 107 to designate a day relevant to the schedule item. Thereafter, the user presses the record button 102 for recording. At this time, the schedule item to be managed is specified in schedule folder S together with the designated day information. In other words, the designated day information and the voice data representing the schedule item to be managed are recorded as a sound data file.

When a plurality of schedule items must be recorded as the items of a schedule for the same day, the plurality of schedule items, that is, a plurality of sound files is specified in folder S in relation to the same day according to a generally adopted recording technique.

Referring back to FIG. 2, if the record button has not been turned on at step S3, the system control unit 6 judges the state of the reproduction button (step S6). If the reproduction button 103 has been turned on, the system control unit 6 runs subroutine Reproduction (step S7).

Subroutine Reproduction to be run at step S7 will be described with reference to the flowchart of FIG. 4.

If the play back button 103 has been turned on at step S6 (see FIG. 2), the system control unit 6 starts playback (step S21). That is to say, the first sound file is reproduced.

For designating a day of a year relevant to an item of a schedule (folder S) before running subroutine Reproduction, the fast feed button 106 and fast rewind button 107 are, as described later, pressed in order to designate the day relevant to the schedule item. For designating either folder A or folder B as a file whose playback is started, the fast feed button 106 and fast rewind button 107 are pressed in order to designate it in advance. The details will be mentioned later.

The operation of playback will be described on the assumption that a day relevant to an item of a schedule or a playback start file has already been designated.

When playback is started, the system control unit 6 judges whether a currently selected folder is schedule folder S (step S22). If the reproduced folder is folder S, the file end of the first sound file being reproduced is detected (step S23). Otherwise, the judgment is repeated until the stop button 104 is turned on (step S27).

At step S23, if the system control unit 6 detects the file end of the sound file, it judges that sound file representing one item of a schedule has come to an end. The system control unit 6 then controls the components of the apparatus so that a predetermined alarm sound will be heard from the loudspeaker 14 (step S24).

According to the first embodiment, the loudspeaker 14 for generating an alarm sound is taken for instance as a reporting means for reporting that playback of one sound data file has been completed. Alternatively, flicker of the LED 10 connected to the system control unit 6 may be used to report it. Otherwise, both the loudspeaker 14 and LED 10 may be used.

Thereafter, the system control unit 6 judges whether the completed sound file is the last sound file (step S25). If the completed sound file is not the last sound file, playback of a sound file representing one item of a schedule that has been recorded next is started (step S26). Control is then returned to step S23.

Processing from step S23 to step S26 is continued until the file end of the last sound file bearing the designated day and contained in folder S is detected. When detecting the file end of the last sound file, the system control unit 6 terminates playback and returns control to the main routine. If the stop button 104 is pressed at the step S27, playback is terminated and control is returned.

If the system control unit 6 judges at step S22 that the sound file whose playback has been started is not contained in folder S, it continues ordinary playback. Specifically, playback of a sound file contained in folder A or folder B is continued until the file comes to an end (step S28) or the stop button 104 is pressed (step S29).

Referring back to FIG. 2, if the playback button has not been turned on at step S6, the system control unit 6 judges the state of the stop button 104 (step S8). If the stop button has been turned on, a predetermined stop mode is established (step S9). If the stop button has not been turned on, the system control unit judges the states of the fast feed button 106 and fast rewind button 107 (step S10 and step S10B).

If the fast feed button 106 or fast rewind button 107 is turned on at step S10 or step S10B, subroutine Fast Feed or subroutine Fast Rewind is run (step S10A or step S10C).

Figure 5:
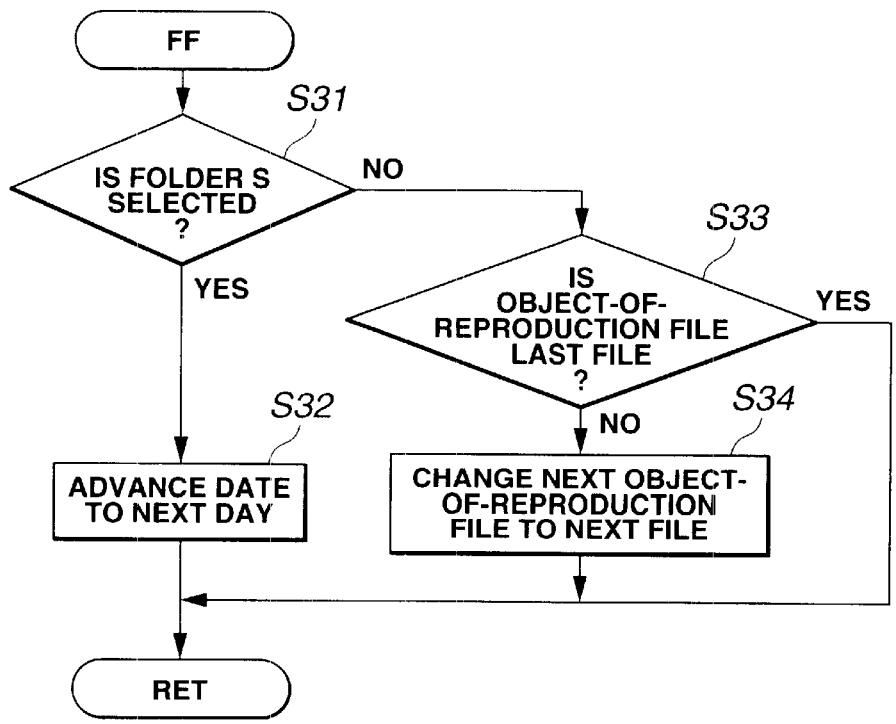
FIG. 5 is a flowchart describing subroutine Fast Feed to be run in the voice recording/reproducing apparatus in accordance with the first embodiment.
Figure 6:
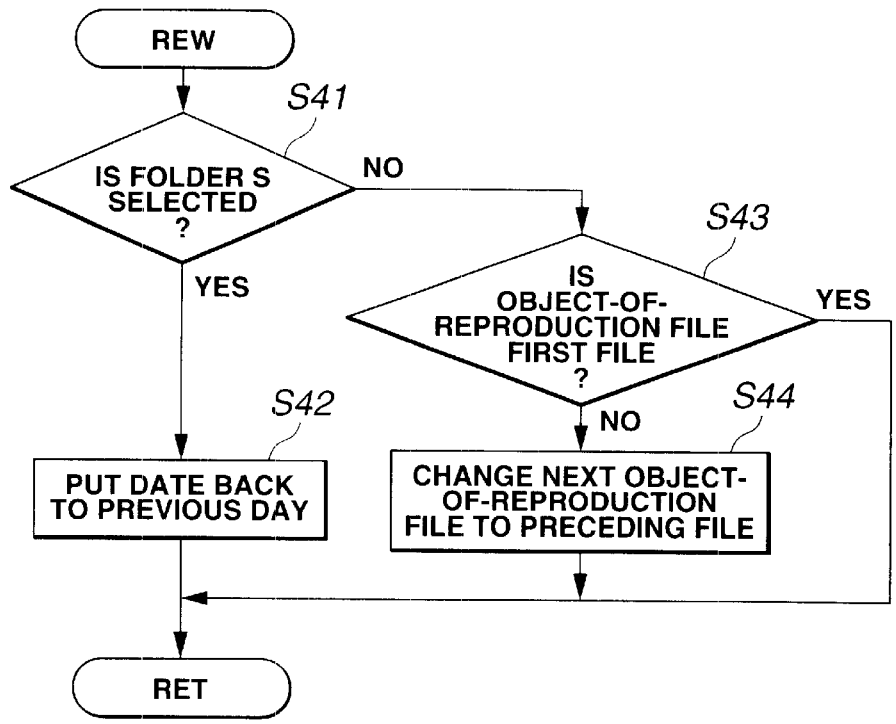
FIG. 6 is a flowchart describing subroutine Fast Rewind to be run in the voice recording/reproducing apparatus in accordance with the first embodiment.

Now, subroutines Fast Feed and Fast Rewind will be described with reference to FIG. 5 and FIG. 6. FIG. 5 and FIG. 6 are flowcharts describing subroutine Fast Feed and Fast Rewind. In other words, the flowcharts describe actions to be performed when the fast feed button 106 and fast rewind button 107 are used to designate a day of a year relevant to an item of a schedule or to designate a play start file. FIG. 5 describes subroutine Fast Feed to be run responsively to a press of the fast feed button 106, while FIG. 6 describes subroutine Fast Rewind to be run responsively to a press of the fast rewind button 107.

FIG. 5 and FIG. 6 describe the operations of the fast feed button 106 and fast rewind button 107 to be exerted for reproduction. The fast feed button 106 and fast rewind button 107 are also used to designate a day for recording, and exert the operations similar to those described in the flowcharts.

As described in FIG. 5, when the fast feed button 106 is pressed prior to execution of reproduction, the system control unit 6 judges whether a selected folder is folder S (step S31). If folder S has been selected, the system control unit 6 judges that the press is involved in reproduction of a schedule. The system control unit 6 then increments a day by one day responsively to each press of the fast feed button, that is, changes the day to the next day (step S32). Control is then returned to the main routine.

If folder S has not been selected, it is judged that the press of the fast feed button is involved in reproduction of folder A or folder B. Unless a current object-of-reproduction file is not the last file (step S33), the object-of-reproduction file is changed from the currently selected one to the next one (step S34). A file whose reproduction is started with execution of reproduction is thus designated (when the current file is the last file, the last file is designated). Control is then returned to the main routine.

As described in FIG. 6, when the fast rewind button 107 is pressed prior to execution of reproduction, the system control unit 6 judges whether a currently selected folder is folder S (step S41). If folder S has been selected, the system control unit 6 judges that the press of the fast rewind button is involved in reproduction of a schedule, and decrements a day by one day responsively to one press, that is, changes the day back to the previous day. Control is then returned to the main routine.

If folder S has not been selected, it is judged that the press of the fast rewind button is involved in reproduction of folder A or folder B. Unless the current object-of-reproduction file is the first file (file 1 in FIG. 7) (step S43), the object-of-reproduction file is changed from the currently selected one to a previous one (step S44). A file whose reproduction is started with execution of reproduction is thus designated (when the current file is the first file, the first file is designated). Control is then returned to the main routine.

With completion of step S10B, control is returned to step S2. It is detected whether the operator buttons have been pressed.

As mentioned above, in the voice recording/reproducing apparatus in accordance with the first embodiment, even if a plurality of schedule items is recorded as the items of a schedule for the same day, all the schedule items for the same day can be checked with one press of the reproduction button.

Moreover, the end of each voice file is reported with an alarm sound or flicker of an LED. The schedule items can be distinguished from one another.

Next, the second embodiment of the present invention will be described. The second embodiment has substantially the same configuration as the first embodiment. Differences alone will be described below.

According to the second embodiment, the system control unit 6 is realized with a microprocessor (CPU), and controls the actions of the components included in the voice recording/reproducing apparatus. The system control unit 6 works as a recording control means for recording a voice file, in which at least predetermined day data and voice data relevant to the day data are specified, on the recording medium (memory card) 7. The system control unit 6 also works as a retrieving means for updating day information to a higher or lower value according to a manipulation performed on the operator unit 15. As the retrieving means, the system control unit 6 judges presence or absence of a voice file bearing day data that corresponds to the updated day information or judges the number of voice files.

Even in the second embodiment, the operator unit 15 is connected to the system control unit 6. The operator unit 15 consists of various operator buttons, that is, the record button REC, reproduction button PLAY, stop button STOP, fast feed button FF, fast rewind button REW, and folder selection button FOLDER. The folder selection button is used to select a folder.

Among the operator buttons, the fast feed button and fast rewind button work as switches used to execute ordinary fast feed and fast rewind operations respectively. Moreover, the fast feed button and fast rewind button work as a day information changing means used to change day information.

What is referred to as day information is day data used to perform arithmetic operations when the system control unit 6 executes day retrieval that will be later. When the fast feed button or fast rewind button works as the day information changing means, the day information is indicated as an actual day of a year on the LCD display device 9 according to how the switches or buttons are manipulated. The system control unit 6 updates the day information to a higher or lower value according to whether the fast feed button or fast rewind button is pressed. The system control unit 6 judges presence or absence of a voice file bearing day data that corresponds to the updated day information. At the same time, the updated day information is indicated as an actual day of a year on the LCD display device 9.

A "day" specified as a day or a year or day information may be replaced with a "year" or "month." The same applies to the first embodiment. Namely, the present invention is not limited to retrieval of a day but may also be applied to retrieval of a year or month.

The voice recording/reproducing apparatus is brought to either of two operating states depending on the time during which the fast feed button or fast rewind button is on or held down uninterruptedly. Specifically, either of the operating states is selected depending on whether the uninterrupted press time during which the button is held down uninterruptedly is equal to or longer than 2 sec.

Assume that the fast feed button and fast rewind button work as, especially, the day information changing means, that is, the dedicated schedule folder is selected. In this case, if the uninterrupted press time falls below 2 sec (the first operating state, that is, a day skip mode is established), day information is updated by one day responsively to one press of the fast feed button or fast rewind button under the control of the system control unit 6. When the uninterrupted press time is equal to or longer than 2 sec (the second operating state, that is, a day continuous retrieval skip mode is established), day information is updated until a voice file bearing day data that corresponds to the day information is retrieved.

Next, actions to be performed in the voice recording/reproducing apparatus in accordance with the second embodiment will be described with reference to FIG. 8 to FIG. 12.

Figure 8:
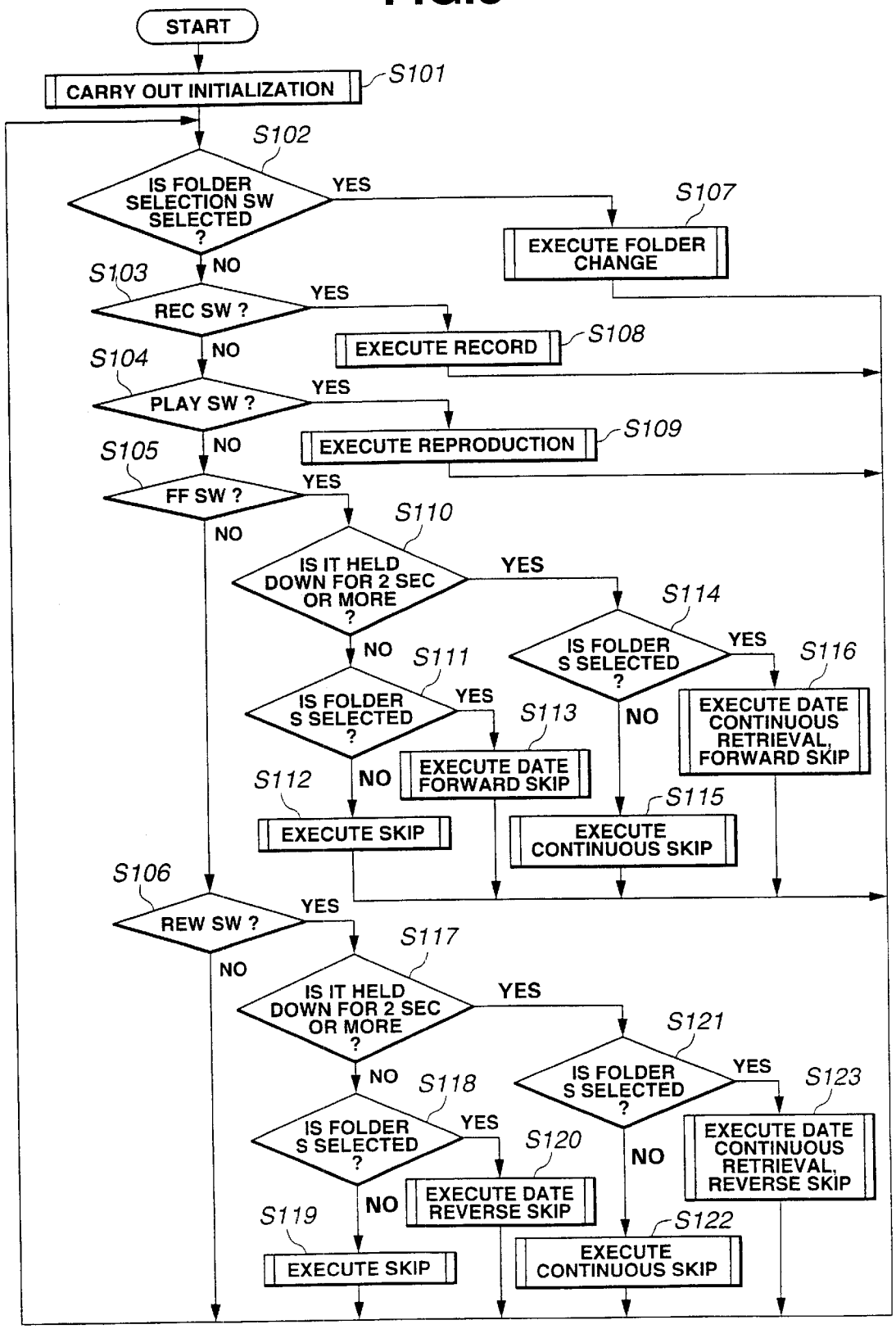
FIG. 8 is a flowchart describing a main processing sequence to be performed in a voice recording/reproducing apparatus in accordance with the second embodiment.

FIG. 8 is a flowchart describing a main processing sequence or a main routine to be run in the voice recording/reproducing apparatus in accordance with the second embodiment.

When the voice recording/reproducing apparatus is powered, the system control unit 8 carries out predetermined initialization as described in FIG. 8 (step S101). Thereafter, the system control unit 6 judges whether the folder selection button included in the operator unit 15 has been turned on (step S102). If the folder selection button has been turned on, subroutine Folder Change is run (step S107).

When subroutine Folder Change is called, the system control unit 6 changes folders, which are sets of voice data files, to select any of them.

The concept of a "folder" employed in the voice recording/reproducing apparatus in accordance with the second embodiment is identical to that described in relation to the first embodiment.

At step S102, the system control unit 6 judges from a press of the folder selection button that the folder change mode has been designated. The system control unit 6 then judges a current folder and changes it to the next one sequentially. Specifically, folders are changed in the order of folder A, folder B, folder S, and then folder A again responsively to one press of the folder selection button. After the change is completed, control is returned to the main routine.

Referring back to the flowchart of FIG. 8, if the folder selection button has not been pressed at step S102, the system control unit 6 judges the state of the record button (step S103). When the record button is turned on, subroutine Record is run (step S108).

At step S108, voice is recorded according to a technique generally adopted for this type of voice recording/reproducing apparatus. At this time, voice data representing one item of a schedule is treated as a voice file and specified in a currently selected folder. For recording voice data as an item of a schedule to be managed, a user selects folder S from among the three folders in advance and records the predetermined schedule item. The voice file is then contained in folder S.

If the record button has not been turned on at step S103, the system control unit 6 judges the state of the reproduction button (step S104). When the reproduction button has been turned on, subroutine Reproduction is run (step S109). At step S109, voice is reproduced according to a technique generally adopted for this type of voice recording/reproducing apparatus. The details will be omitted.

It the reproduction button has not been turned on at step S104, the system control unit 6 judges the state of the fast feed button (step S105). If the fast feed button has been turned on, the system control unit 6 judges whether the fast feed switch has been held down uninterruptedly for 2 sec or longer (step S110). If the uninterrupted press time during which the fast feed switch is held down is less than 2 sec, it is judged whether a currently selected folder is folder S (step S111). If it is not folder S, folder A or folder B is selected normally. The system control unit 6 then executes an ordinary fast feed (skip) operation responsively to one press of the fast feed button (step S112).

If folder S has been selected at step S111, it means that the first operating state, that is, the day skip mode has been designated. Subroutine Day Forward Skip is run (step S113).

Figure 9:
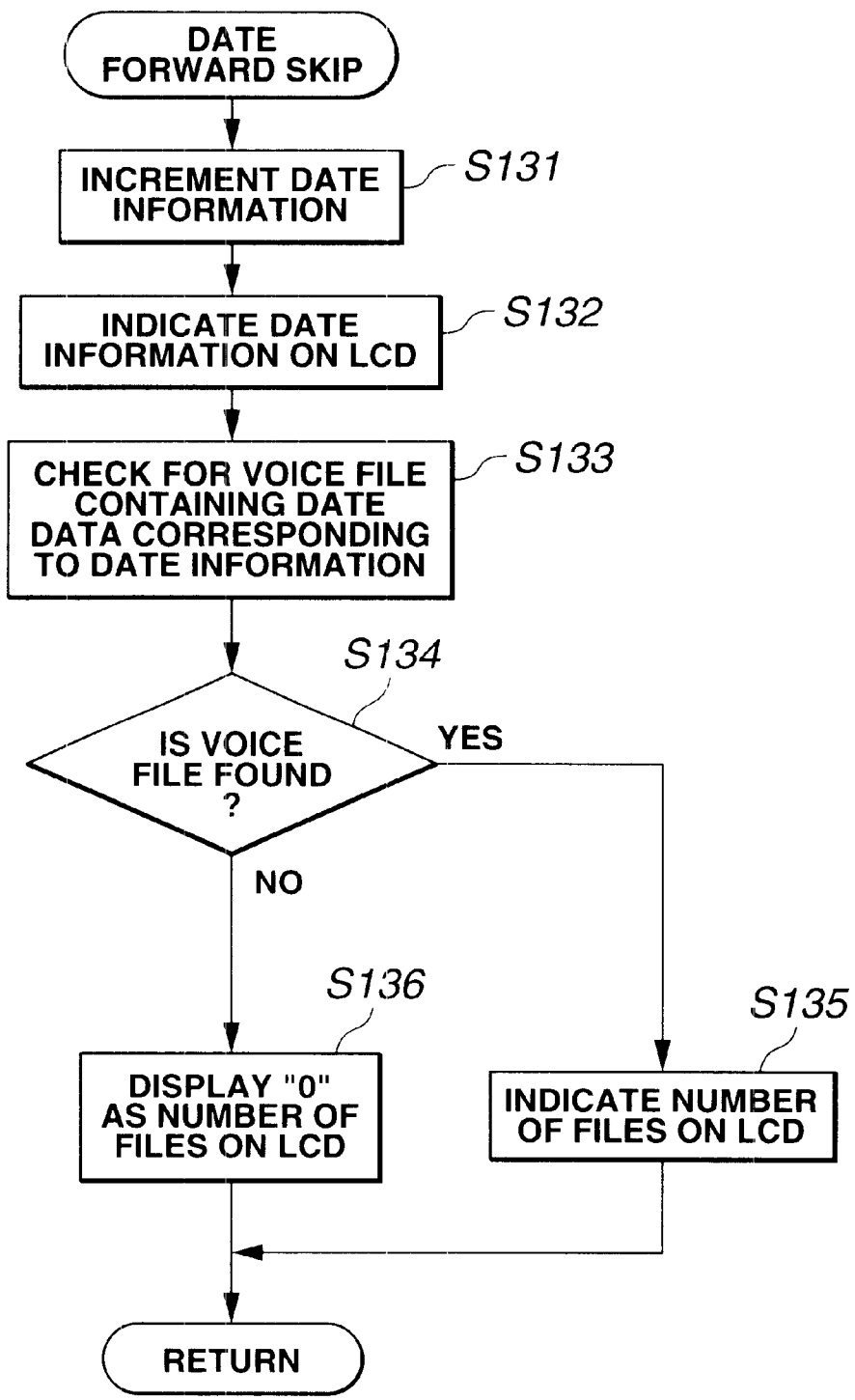
FIG. 9 is a flowchart describing subroutine Date Forward Skip to be run in the voice recording/reproducing apparatus in accordance with the second embodiment.

Subroutine Day Forward Skip will be described with reference to the flowchart of FIG. 9.

The system control unit 6 increments day information responsively to one press of the fast feed button (step S131). The updated day information is then indicated on the LCD display device (step S132). The system control unit 6 then checks for a voice file bearing day data that corresponds to the day information (step S133). If the voice file is present (step S134), the number of voice files is indicated on the LCD display device 9 (step S135). Control is then returned to the main routine.

If it is found at step S134 that the voice file is absent, the fact is indicated on the LCD display device 9 (step S136). Control is then returned to the main routine.

If the uninterrupted press time during which the fast feed button is held down uninterruptedly is found to be 2 sec or longer at step S110, it is judged whether a currently selected folder is folder S (step S114). If the currently selected folder is not folder S, it means that normal folder A or folder B is selected. The system control unit 6 then executes an ordinary continuous fast feed (continuous skip) operation (step S115).

If it is found at step S114 that folder S has been selected, it means that the second operating state that is the day continuous forward skip mode has been designated. Subroutine Day Continuous Forward Skip is then run (step S116).

Figure 10:
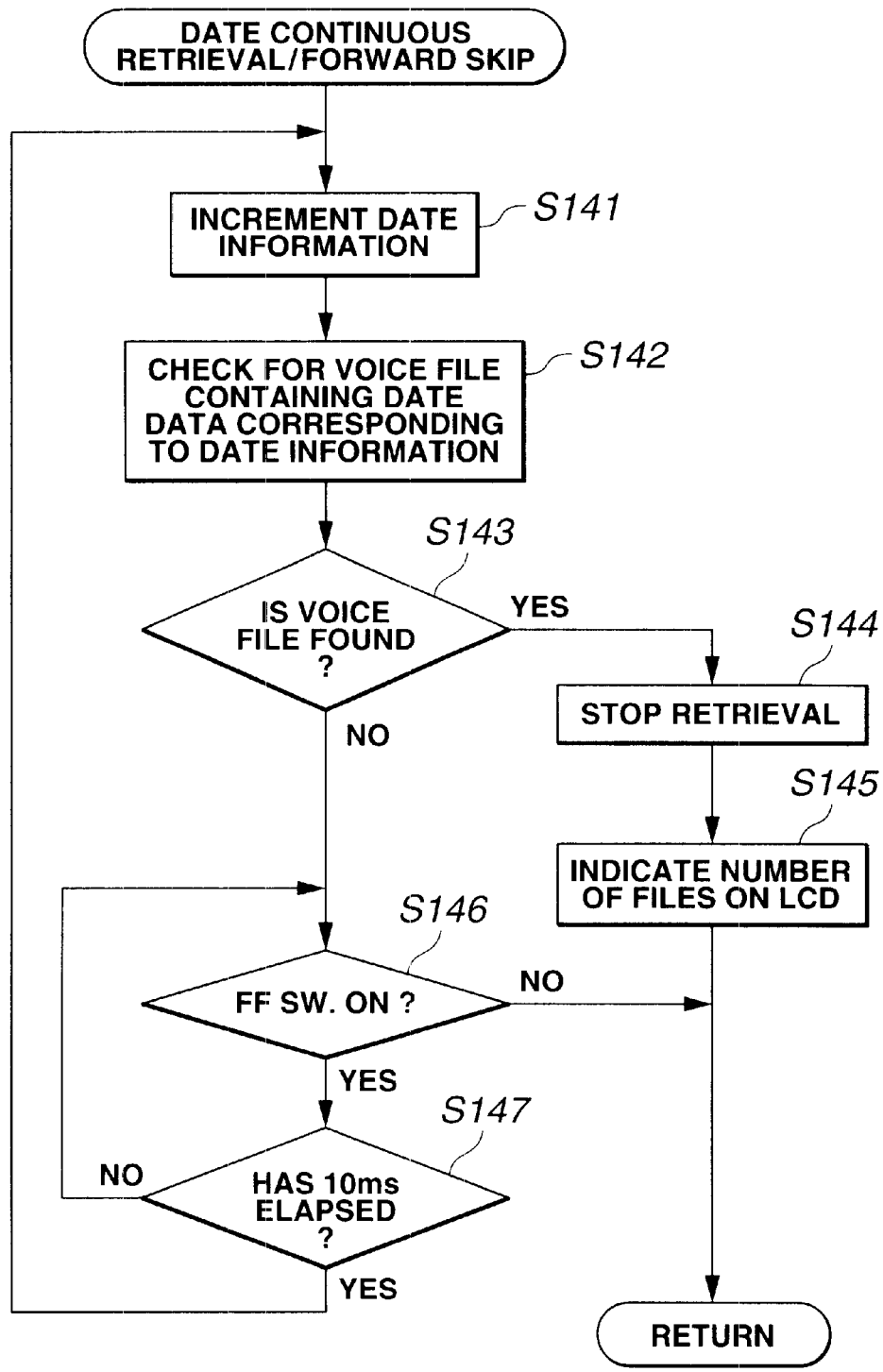
FIG. 10 is a flowchart describing subroutine Date Continuous Retrieval/forward Skip to be run in the voice recording/reproducing apparatus in accordance with the second embodiment.

Subroutine Day Continuous Forward Skip will be described with reference to the flowchart of FIG. 10.

The system control unit 6 increments day information (step S141), and checks for a voice file bearing day data that corresponds to the updated day information (step S142). If the voice file is present (step S143), retrieval is stopped (step S144). The number of voice files is indicated on the LCD display device 9 (step S145). Control is then returned to the main routine.

If it is found at step S143 that the voice file is absent, the state of the fast feed button is detected again (step S146). If the fast feed button is still on (step S147), control is returned to step S141. Day information is further incremented and retrieval of the voice file is continued.

If it is found at step S146 that the fast feed button is not on, control is returned to the main routine.

Referring back to the flowchart (describing the main routine) of FIG. 8, if the fast feed button has not been turned on at step S5, the system control unit 6 judges the state of the fast rewind button (step S106). If the fast rewind button has been turned on, the system control unit 6 judges whether the fast rewind button has been held down uninterruptedly for 2 sec or longer (step S117). If the uninterrupted press time is less than 2 sec, it is judged that a currently selected folder is folder S (step S118). If the currently selected folder is not folder S, it means that normal folder A or folder B has been selected. The system control unit 6 then executes an ordinary fast rewind (skip) operation responsively to one press of the fast rewind button (step S119).

If it is found at step S118 that folder S has been selected, it means that the first operating state, that is, the day skip mode has been designated. Subroutine Day Reverse Skip is then run (step S120).

Figure 11:
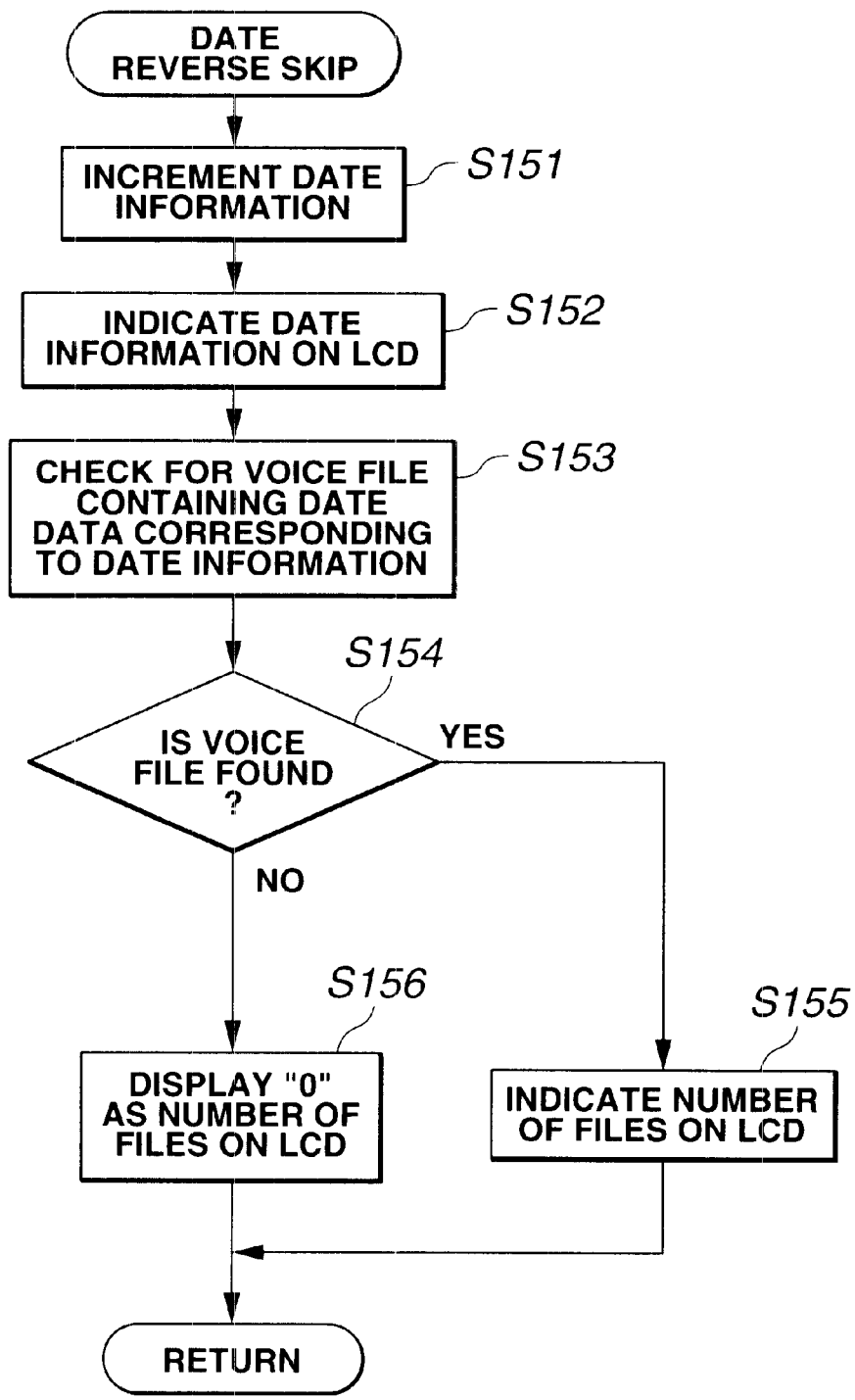
FIG. 11 is a flowchart describing subroutine Date Reverse Skip to be run in the voice recording/reproducing apparatus in accordance with the second embodiment.

Subroutine Day Reverse Skip will be described with reference to the flowchart of FIG. 11.

The system control unit decrements day information responsively to one press of the fast rewind button (step S151).

When the fast rewind button has been turned on, the system control unit 6 indicates the updated day information on the LCD display device 9, and checks for a voice file bearing day data that corresponds to the day information. If the voice file is present, the number of voice files is indicated on the LCD display device 9. Control is then returned to the main routine (steps S152, S153, S154, and S155). In contrast, if the voice file is absent, the fact is indicated on the LCD display device 9 (step S156). Control is then returned to the main routine.

Referring to FIG. 8, when the uninterrupted press time of the fast rewind button is found to be 2 sec or longer at step S17, the system control unit 6 judges whether a currently selected folder is folder S (step S121). If the currently selected folder is not folder S, it means that normal folder A or folder B has been selected. The system control unit 6 then executes an ordinary continuous fast rewind (continuous skip) operation (step S122).

If it is found at step S121 that folder S has been selected, it means that the second operating state, that is, the day continuous reverse skip mode has been designated. Subroutine Day Continuous Retrieval/reverse Skip is then run (step S123).

Figure 12:
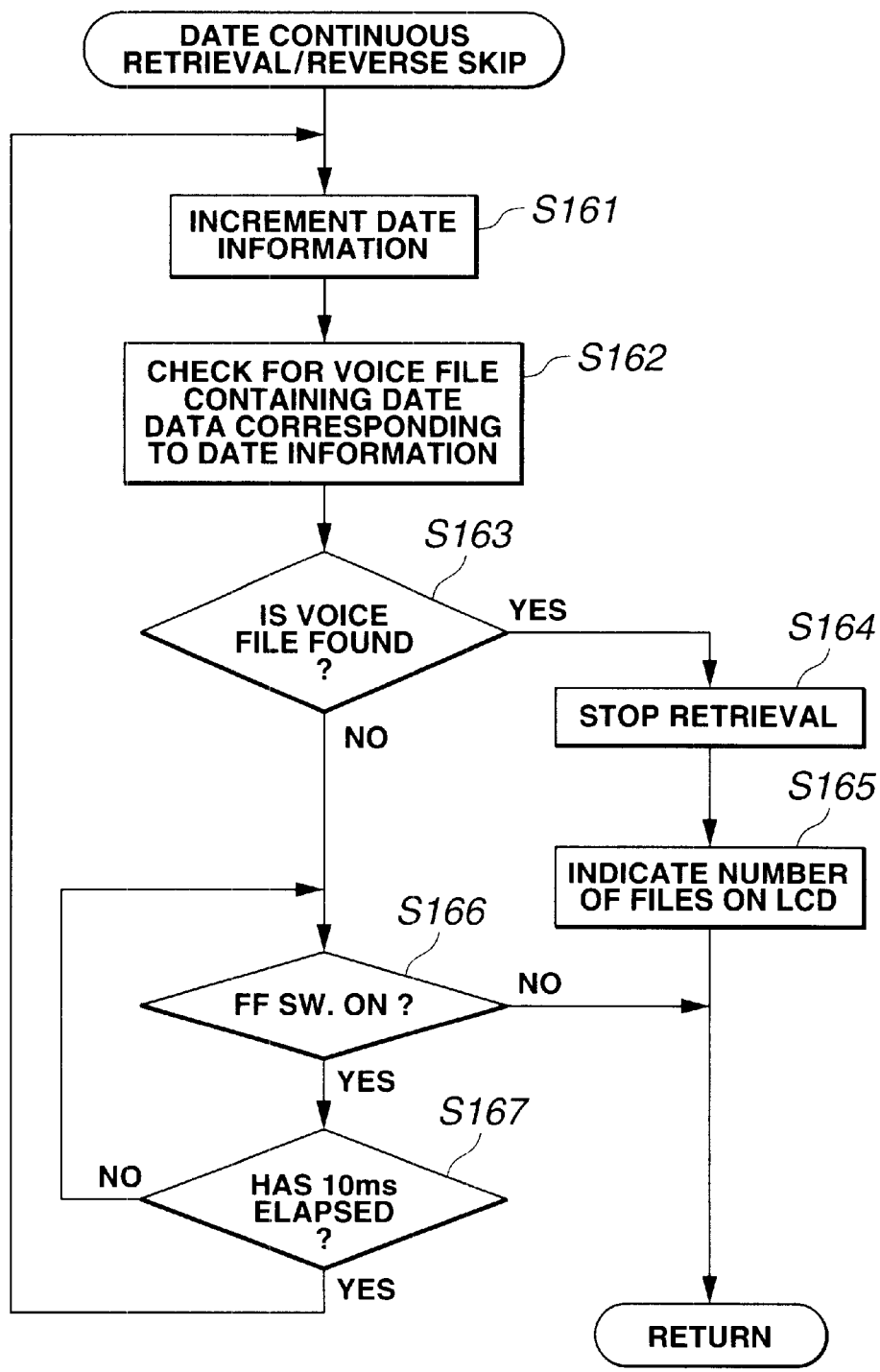
FIG. 12 is a flowchart describing subroutine Date Continuous Retrieval/reverse Skip to be run in the voice recording/reproducing apparatus in accordance with the second embodiment.

Subroutine Day continuous Retrieval/reverse Skip will be described with reference to the flowchart of FIG. 12.

The system control unit 6 decrements day information (step S161). The system control unit 6 then, as mentioned above, checks for a voice file bearing day data that corresponds to the updated day information. If the voice file is present, retrieval is stopped. The number of voice files is then indicated on the LCD display device 9, and control is returned to the main routine (steps S162, S163, S164, and S165).

If the voice file is absent, the state of the fast rewind button is detected again (step S166). If the fast rewind button is still on (step S167), control is returned to step S161. The day information is further decremented and retrieval of the voice file is continued.

If it is found at step S166 that the fast rewind button has not been turned on, control is returned to the main routine.

Referring to FIG. 8, if it is found at step S106 that the fast rewind button is not on. Control is returned to step S102 and the states of the operator buttons are detected.

As mentioned above, according to the present embodiment, recorded items of schedules can be learned quickly without the necessity of making the voice recording/reproducing apparatus large in size.

According to the second embodiment, as mentioned above, the number of folders is set to three. Needless to say, the present invention can be implemented in a recording/reproducing apparatus in which a larger number of folders are employed.

Next, the third embodiment of the present invention will be described.

Figure 13:
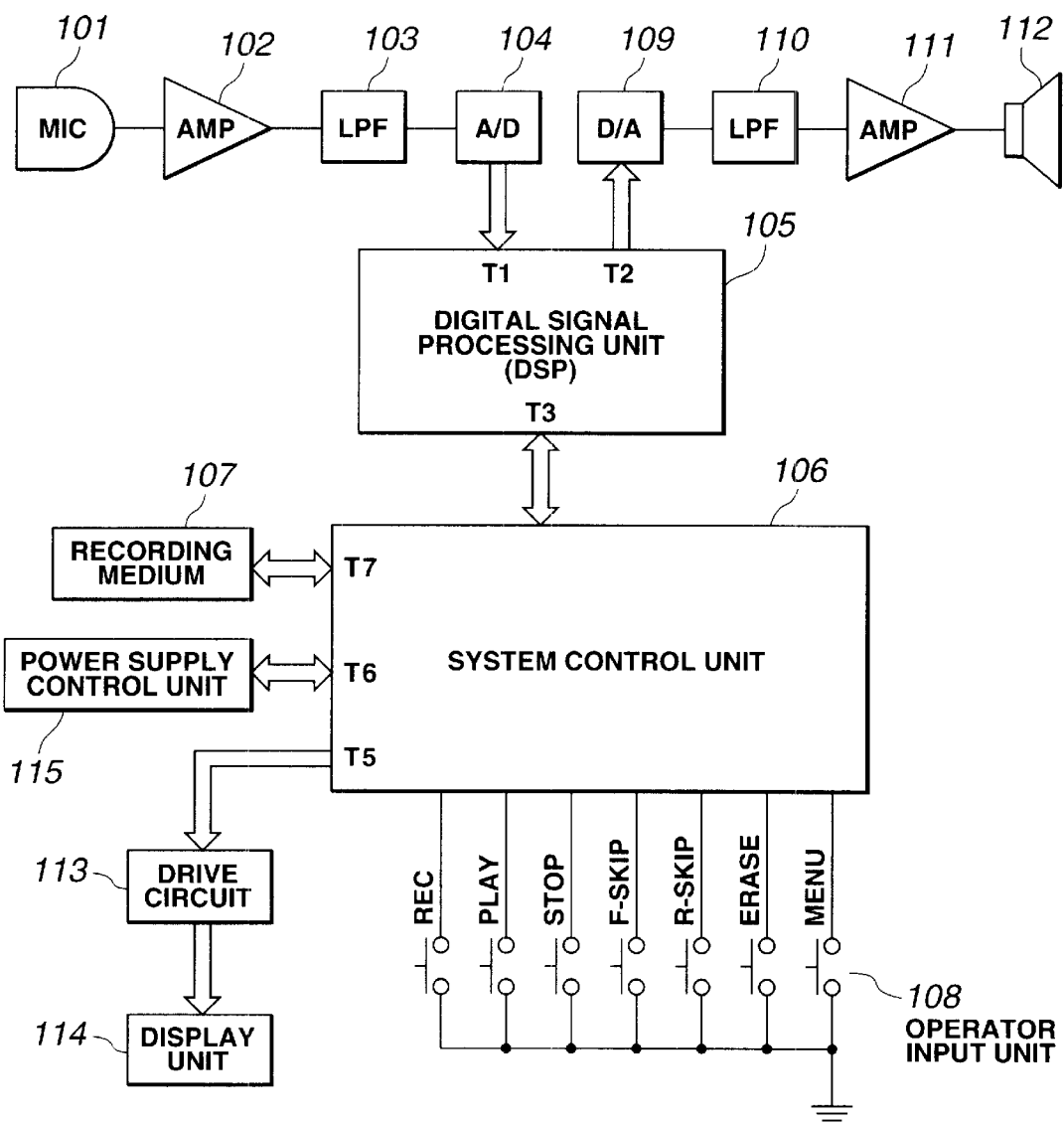
FIG. 13 is a block circuit diagram showing the configuration of a digital recorder to which a voice recording/reproducing apparatus in accordance with the third embodiment is adapted.

FIG. 13 shows the configuration of a digital recorder to which a voice recording/reproducing apparatus in accordance with the third embodiment is adapted. In FIG. 13, a microphone 101 is connected to a terminal T1 of a digital signal processing unit (DSP) 105 via an amplifier (AMP) 120, a low-pass filter (LPF) 103, and analog-to-digital (A/D) converter 104. A loudspeaker 112 is connected to a terminal T2 of the DSP 105 via a digital-to-analog (D/A) converter 109, a low-pass filter (LPF) 110, and amplifier (AMP) 111.

A terminal T3 of the DSP 105 is connected to a terminal T4 of a system control unit (CPU) 106 serving as an indication switching control means. A display unit (display means) 114 is connected to a terminal T5 of the CPU 106 via a drive circuit 113. A power supply control unit 115 is connected to a terminal T6, and a built-in recording medium 107 is connected to a terminal T7. The recording medium 107 may be freely loaded or unloaded into or from the apparatus. An operator input unit 108 having various operator buttons is connected to the CPU 106. The operator buttons include a record button REC, a reproduction button PLAY, a stop button STOP, a forward skip button F-SKIP, a reverse skip button R-SKIP, an erasure button ERASE, and a menu button MENU.

A typical recording/reproducing operation to be performed by the digital recorder will be described below. When an operator presses the record button, a record mode is designated. After voice input through the microphone 101 is converted into an electric signal, the amplifier 102 amplifies the electric signal. The low-pass filter 103 removes unnecessary frequency components of the electric signal. Thereafter, the A/D converter 104 digitizes the electric signal and inputs it to the DSP 105. The DSP 105 compresses the digital voice signal. Thereafter, the digital voice signal is recorded as voice data on the recording medium 107 under the control of the CPU 106.

When an operator presses the reproduction button, a reproduction mode is designated. Voice data is read from the recording medium 107 under the control of the CPU 106, and then decompressed by the DSP 105. The decompressed voice signal is converged into an analog form by the D/A converter 109. Thereafter, the low-pass filter 110 removes unnecessary frequency components of the analog voice signal. The amplifier 111 amplifies the voice signal. The voice signal is then output from the loudspeaker 112, whereby voice is heard.

If the stop button is pressed during the aforesaid voice recording or voice reproduction, the voice recording or voice reproduction is stopped. Various kinds of information are indicated on the display unit 114 depending on a mode. Moreover, the power supply control unit 115 controls power to be supplied to the components of the apparatus or gives control to save power.

Figure 14:
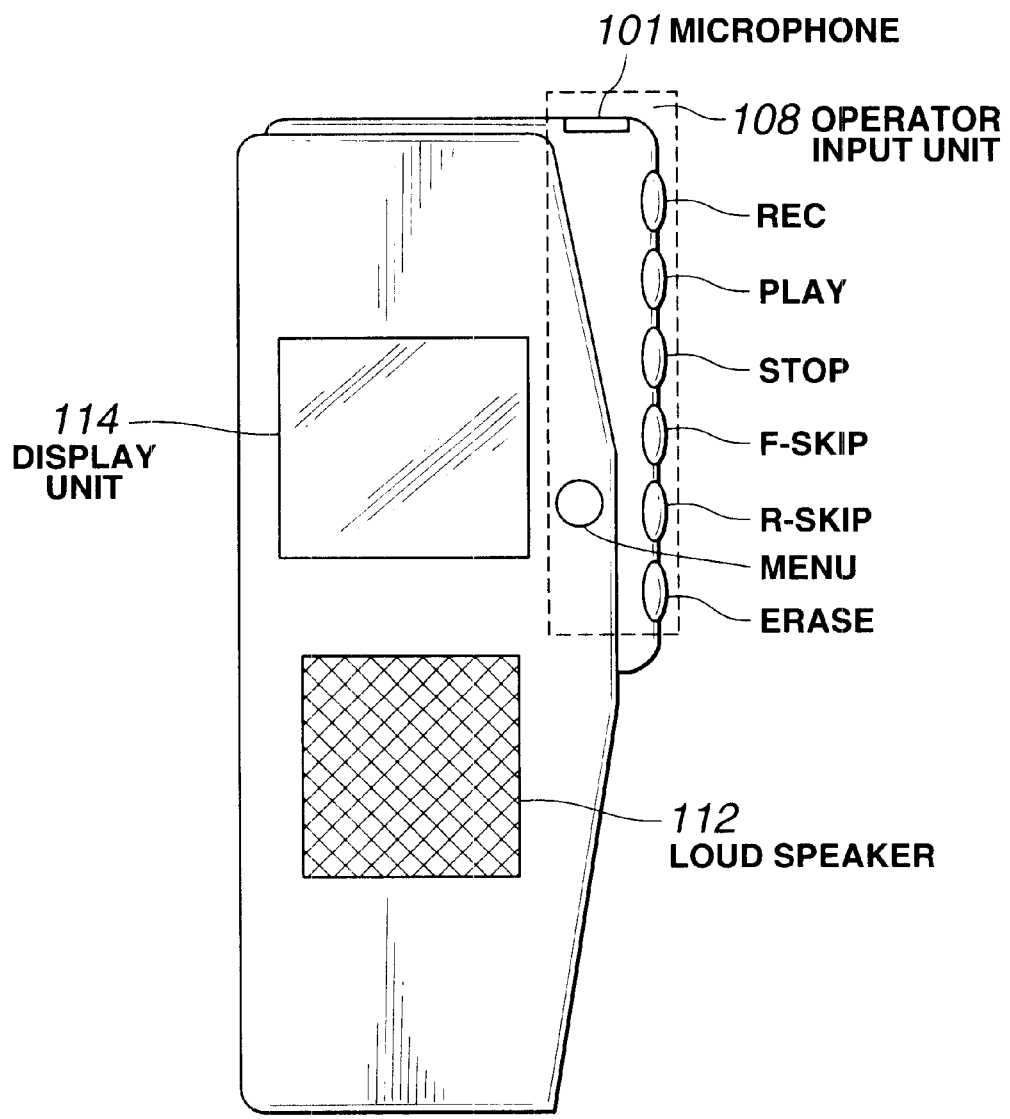
FIG. 14 is a front view showing the appearance of a voice recording/reproducing apparatus in accordance with the third embodiment.

FIG. 14 shows the appearance of the digital recorder. In addition to the operator input unit 108 having the record button, reproduction button, stop button, forward skip button, reverse skip button, menu button, and erasure button, the microphone 101, display unit 114, and loudspeaker 112 are arranged at predetermined positions.

Figure 15:
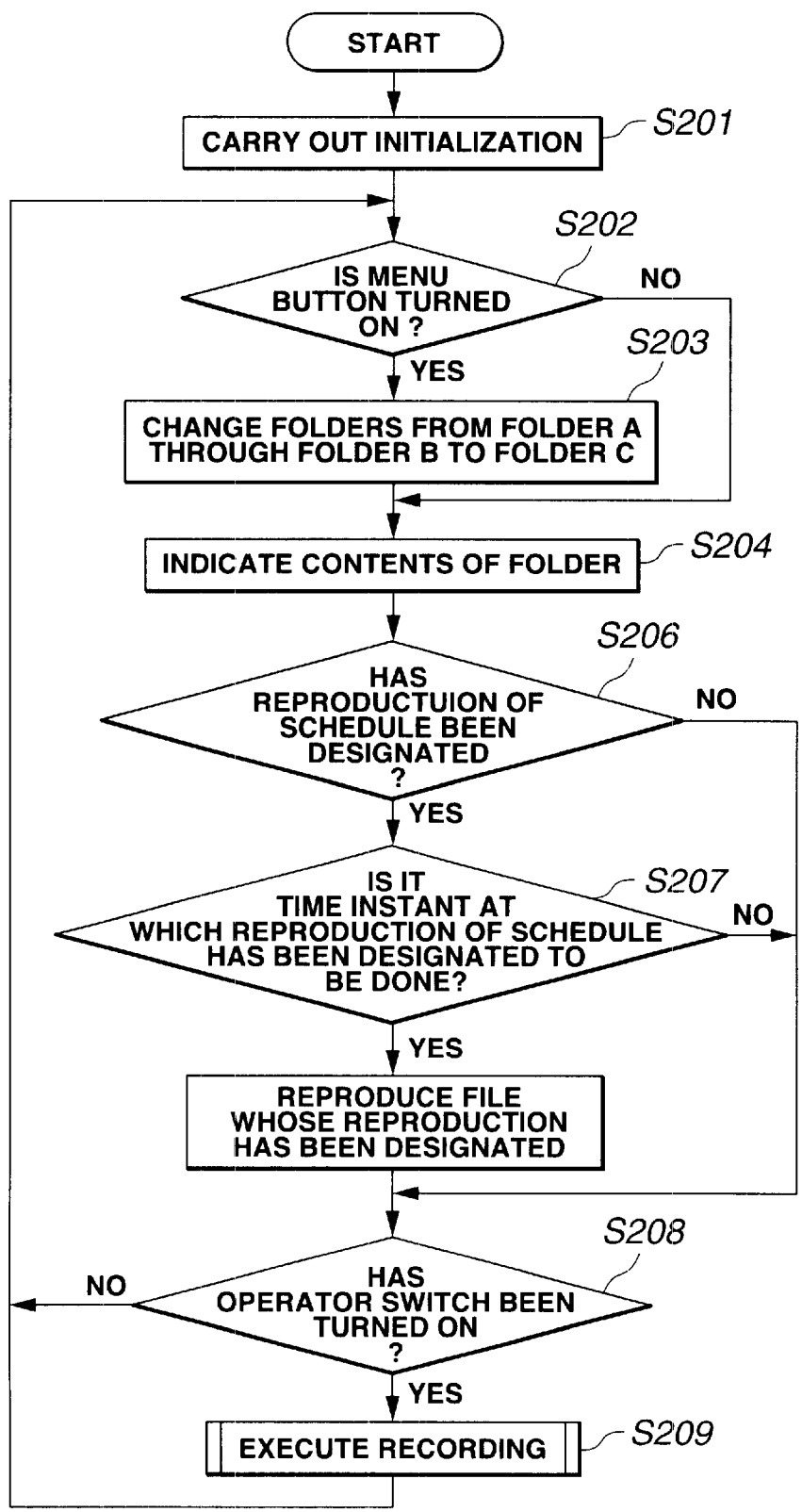
FIG. 15 is a flowchart describing the processing to be performed by a CPU, which is included in the voice recording/reproducing apparatus in accordance with the third embodiment, responsive to an operator's manipulation.

FIG. 15 is a flowchart describing the details of actions to be performed by the CPU according to an operator's manipulation. When a battery is loaded, this processing flow is started. To begin with, at step S201, initialization is carried out to check a memory or the like. It is then judged whether the menu button has been turned on (step S202). If the judgment is made in the affirmative, control is passed to step S203 of changing folders. Folders are then changed in the order of folder A, folder B, and then folder S responsively to one press of the menu button. After folder S is selected, if the menu button is turned on again, folder S is changed to folder A. Incidentally, a folder consists of one or more files. Three folders of folder A, folder B, and folder S are employed in the third embodiment. Folders A and B are folders used to record general voice data and intended for different purposes of use. Folder S is a folder dedicated to recording of schedules.

Figure 17A:
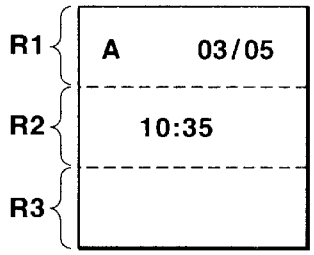
FIG. 17A shows an example of indications to be displayed on a display unit included in the voice recording/reproducing apparatus in accordance with the third embodiment.

At the next step S204, the contents of a selected folder are indicated on the display unit 114. FIG. 17A shows an indication to be displayed when folder A is selected. "A" displayed in a display area R1 indicates folder A. "03" in "03/05" indicates a current file number, and "05" therein indicates the number of all files contained in folder A. "10:35" displayed in a display area R2 indicates a current time instant. At the next step S205, it is judged whether reproduction of an item of a schedule has been designated. If the judgment is made in the affirmative, it is judged at step S206 whether it is the time instant at which reproduction of a schedule item has been designated to be done. If the judgment is made in the affirmative, a file of the schedule item whose reproduction has been designated is reproduced at step S207.

Figure 17B:
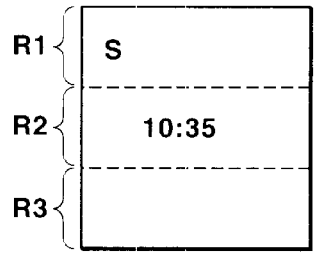
FIG. 17B shows another example of the indications to be displayed on the display unit included in the voice recording/reproducing apparatus in accordance with the third embodiment.

FIG. 17B shows an indication to be displayed during reproduction of a file. "S" indicating a folder dedicated to recording of schedules is displayed in the display area R1. "10:35" indicating a current time instant is displayed in the display area R2.

After the file of the schedule item whose reproduction has been designated is reproduced, control is passed to step S208. If reproduction of an item of a schedule has not been designated (the judgment of step S205 is made in the negative), or although reproduction of a schedule item has been designated, if it is not yet the time instant at which reproduction of the schedule item has been designated to be done (the judgment of step S206 is made in the negative), control is passed to step S208. At step S208, it is judged if any of the operator switches has been turned on. If the judgment is made in the affirmative, recording to be described later is carried out. Control is then returned to step S202. If the judgment of step S208 is made in the negative, control is returned immediately to step S202.

Figure 16:
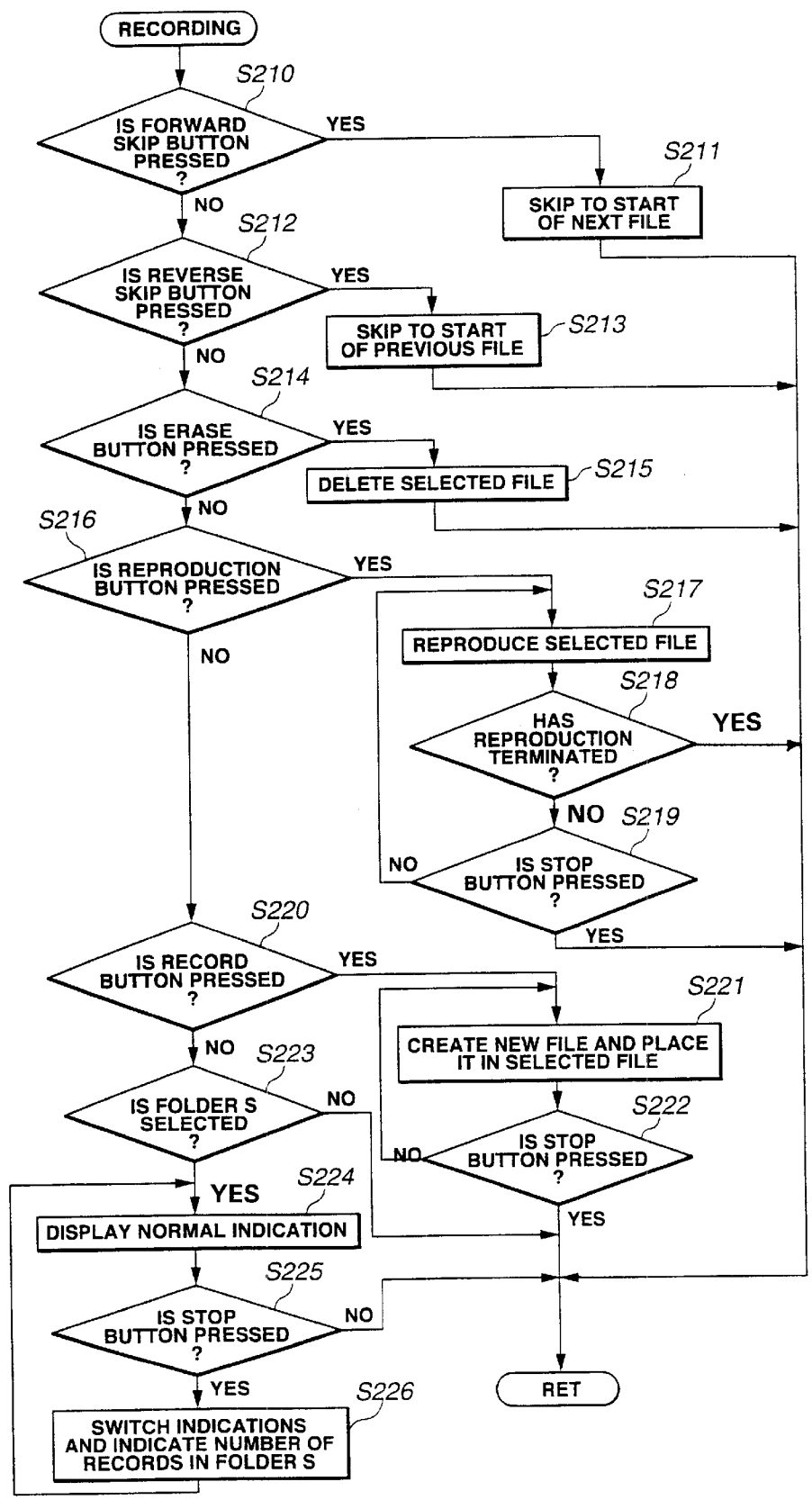
FIG. 16 is a flowchart describing recording (step S209) to be performed in the voice recording/reproducing apparatus in accordance with the third embodiment.

FIG. 16 is a flowchart detailing recording (step S209 in FIG. 15). First, it is judged at step S210 whether the forward skip button has been pressed. If the judgment is made in the affirmative, control is passed to step S211. A skip is made to the start of the next file. Control is then returned. If the judgment of step S210 is made in the negative, control is passed to step S112. It is judged whether the reverse skip button has been pressed. If the judgment is made in the affirmative, control is passed to step S213. A skip is made to the start of an immediately previous file. Control is then returned. If the judgment of step S212 is made in the negative, control is passed to step S214. It is then judged whether the erasure button has been pressed. If the judgment is made in the affirmative, control is passed to step S215. A selected file is erased and control is returned.

Figure 17C:
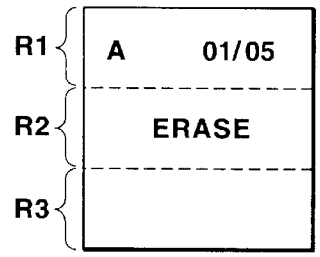
FIG. 17C shows another example of the indications to be displayed on the display unit included in the voice recording/reproducing apparatus in accordance with the third embodiment.

FIG. 17C shows an indication to be displayed on the display unit 114 during erasure of a file. "A" appearing in the display area R1 indicates folder A. "01" in "01/05" indicates a file number to be erased, and "05" therein indicates the number of all files contained in folder A. "ERASE" flickers in the display area R2.

Figure 17D:
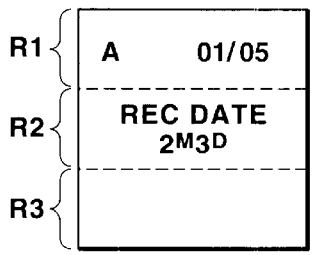
FIG. 17D shows another example of the indications to be displayed on the display unit included in the voice recording/reproducing apparatus in accordance with the third embodiment.
Figure 17E:
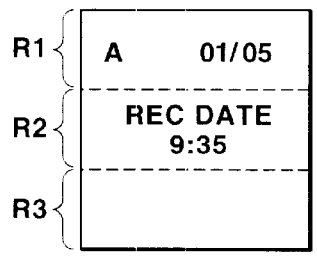
FIG. 17E shows another example of the indications to be displayed on the display unit included in the voice recording/reproducing apparatus in accordance with the third embodiment.

If the judgment of step S214 is made in the negative, control is passed to step S216. It is then judged whether the reproduction button has been pressed. If the judgment is made in the affirmative, control is passed to step S217. A selected file is reproduced. When the reproduction starts, "A" indicating folder A and "01/05" are, as shown in FIG. 17D, displayed in the display area R1. "01" in "01/05" indicates a file number being reproduced, and "05" therein indicates the number of all files contained in folder A. "REC DATE" indicating a date of recording flickers in the display area R2. A month/day of recording (herein, 2M3D) is indicated first. A time instant of recording (herein, 9:35) is then indicated as shown in FIG. 17E.

Figure 17F:
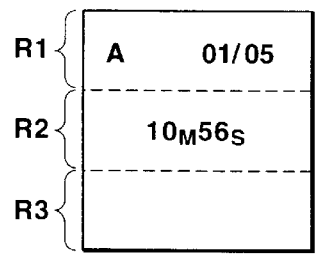
FIG. 17F shows another example of the indications to be displayed on the display unit included in the voice recording/reproducing apparatus in accordance with the third embodiment.

"REC DATE" is displayed in the display area R1 during a predetermined time (herein 4 sec) after the start of reproduction. After 4 sec elapses, the indication disappears. Moreover, a month/day of recording and a time instant of recording are indicated alternately in the display area R2. The information is indicated for only the predetermined time (herein 4 sec) after the start of reproduction. After 4 sec elapses, a reproduction time required to reproduce the remaining part of a reproduction file (herein 10M56S) is indicated as shown in FIG. 17F.

During reproduction, it is judged whether reproduction has been completed (step S218) or whether the stop button has been pressed (step S219). Unless either of the judgments is made in the affirmative, the foregoing reproduction is continued. When reproduction has been completed or the stop button has been pressed, reproduction is terminated. Control is then returned.

If the judgment of step S216 is made in the negative, control is passed to step S220. It is then judged whether the record button has been pressed. If the judgment is made in the affirmative, control is passed to step S221. Input voice is recorded as a new file to be contained in a selected folder (herein folder A).

Figure 17G:
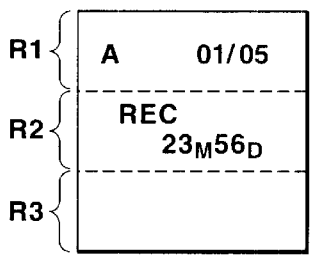
FIG. 17G shows another example of the indications to be displayed on the display unit included in the voice recording/reproducing apparatus in accordance with the third embodiment.

FIG. 17G shows an indication to be displayed on the display unit 114 during recording. "A" indicating folder A and "01/05" are displayed in the display area R1. "01" in "01/05" indicates a file number being recorded and "05" therein indicates the number of all files contained in folder A. "REC" indicating a record mode is displayed in the display area R2, and a record enabled time (herein 23M56S) is indicated therein. During recording, it is judged whether the stop button has been pressed (step S222). If the stop button has not been pressed, recording is continued. If the stop button has been pressed, recording is stopped and control is returned.

If the judgment of step S220 is made in the negative, control is passed to step S223. It is then judged whether folder S that is a folder dedicated to recording of schedules has been selected. If the judgment is made in the affirmative, control is passed to step S224. An ordinary indication is then displayed.

Figure 17H:
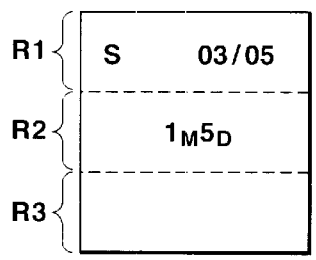
FIG. 17H shows another example of the indications to be displayed on the display unit included in the voice recording/reproducing apparatus in accordance with the third embodiment.

FIG. 17H shows an ordinary indication to be displayed when folder S is selected. "S" indicating folder S and "03/05" are displayed in the display area R1. "03" in "03/05" indicates a current file number and "05" therein indicates the number of recorded schedule items, that is, the number of files relevant to a day indicated in the display area R2 (herein January 5th (1M5D)). If the judgment of step S223 is made in the negative, control is returned.

Figure 17I:
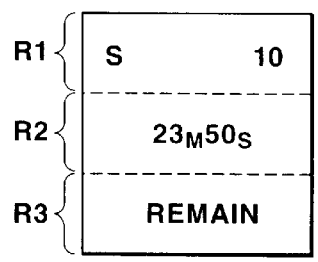
FIG. 17I shows another example of the indications to be displayed on the display unit included in the voice recording/reproducing apparatus in accordance with the third embodiment.
Figure 17J:
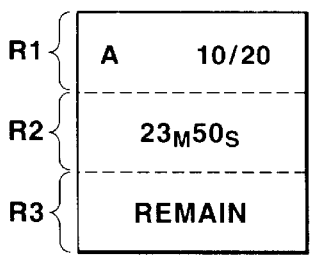
FIG. 17J shows another example of the indications to be displayed on the display unit included in the voice recording/reproducing apparatus in accordance with the third embodiment.

Control is then passed to step S224. It is then judged whether the stop button has been pressed. If the judgment is made in the affirmative, control is passed to step S225. The indication shown in FIG. 17H is switched to the one shown in FIG. 17I. After the indications are switched, the number of recorded schedule items, that is, the number of files contained in folder S (herein 10) is indicated in the display area R1. A remaining memory access time (herein 23M50S) is indicated in the display area R2. "REMAIN" is displayed in the display area R3. As shown in FIG. 17J, the number of all the records contained in folder S (herein 10) and the number of remaining schedule items that can be recorded, that is, the number of all files (herein 20) may be indicated in pair (herein "10/20").

As mentioned above, according to the third embodiment, when folder S that is a folder dedicated to recording of schedules is selected, the number of all voice files relevant to a designated day is indicated (FIG. 17H). In this state of the display unit, if an operator performs a predetermined manipulation, that is, presses the stop button, the number of all the voice files contained in folder S and recorded to represent items of schedules is indicated (FIG. 17I). The states of voice files recorded to represent items of schedules can be grasped clearly using a limited display space. Moreover, in addition to the number of all the voice files contained in folder S, the number of remaining voice files that can be recorded is indicated as shown in FIG. 17J. The number of all schedule items that can be recorded can be learned.

In this specification, a set of data items is referred to as a "folder." The present invention is not limited to this idea. Needless to say, the present invention can be implemented in an apparatus for dealing with a set of data items referred to as a "file" or any other name.

In this invention, it is apparent that a wide range of different embodiments can be formed based on the invention without a departure from the spirit and scope of the invention. This invention will not be restricted by any specific embodiment but will be limited by the appended claims.

What is claimed is:

1. A voice recording/reproducing apparatus comprising:
   a recording medium;
   recording control means for recording on said recording medium a sound which contains at least predetermined day data and voice data relevant to the day data;
   day information changing means for use in changing day information;
   retrieving means for updating the day information to a higher or lower value according to a manipulation performed by said day information changing means, and for judging a presence or absence of a sound file bearing day data that corresponds to the updated day information;
   reporting means for reporting a result of a retrieval performed by said retrieving means which indicates the presence of the sound file bearing day data that corresponds to the updated day information; and
   playback means for playing back sound data contained in the sound file bearing day data that corresponds to the updated day information;
   wherein said day information changing means is used to selectively establish a first operating state and a second operating state that is different from the first operating state with respect to said retrieving means;
   wherein when the first operating state is established according to the manipulation performed by said day information changing means, said retrieving means updates day information by one day; and
   when the second operating state is established, said retrieving means updates the day information until a sound file bearing day data that corresponds to the day information is retrieved.

2. A voice recording/reproducing apparatus according to claim 1, wherein said reporting means comprises a display device.

3. A voice recording/reproducing apparatus according to claim 1, wherein said reporting means comprises an acoustic device.

4. A voice recording/reproducing apparatus comprising:
   a recording medium;
   recording control means for recording on said recording medium a sound file which contains at least predetermined day data and voice data relevant to the day data,
   day information changing means for use in changing day information;
   retrieving means for updating the day information to a higher or lower value according to a manipulation performed by said day information changing means, and for judging a presence or absence of a sound file bearing day data that corresponds to the updated day information;
   reporting means for reporting a number of sound files present when a result of a retrieval operation performed by said retrieving means indicates the presence of a sound file bearing day data that corresponds to the updated day information;
   playback means for playing back sound data contained in a sound file bearing day data that corresponds to the updated day information;
   wherein said day information changing means is used to selectively establish a first operating state and a second operating state that is different from the first operating state with respect to said retrieving means;
   wherein when the first operating state is established according to a manipulation performed on said day information changing means, said retrieving means updates day information by one day; and
   wherein when the second operating date is established, said retrieving means updates the day information until a sound file bearing day data that corresponds to the day information is retrieved.

5. A voice recording/reproducing apparatus according to claim 4, wherein said reporting means comprises a display device.

6. A voice recording/reproducing apparatus according to claim 4, wherein said reporting means comprises an acoustic device.

7. A voice recording/reproducing apparatus comprising:
   a recording medium on which a plurality of sound data items may be recorded;
   a calendar information appending means for appending arbitrary calendar information to sound data;
   a first folder containing voice data out of the sound data stored on said recording medium to which no calendar information is appended by said calendar information appending means; and
   a second folder containing voice data out of the sound data stored on said recording medium to which calendar information is appended by said calendar information appending means;
   wherein said second folder includes a plurality of day folders sorted by day, and sound data is contained in a day folder selected according to a day appended by said calendar information appending means.

8. A voice recording/reproducing apparatus comprising:
   a recording medium on which a plurality of sound data items may be recorded;
   a first folder not including day folders sorted by day;
   a second folder including a plurality of day folders sorted by day;
   a folder selector for selecting one of said first folder and said second folder;
   a day information designation unit for use in designating any day; and
   a controller which controls sound data to be recorded as a day folder bearing a day designated using said day information designation unit when said second folder is selected by said folder selector;
   wherein when said first folder is switched to said second folder by said folder selector on a given day, said day information designation unit is used to designate the given day as a day of a year.

9. A voice recording/reproducing apparatus according to claim 8, wherein said day information designation unit changes the day forward responsive to a manipulation performed on a fast feed switch included in said voice recording/reproducing apparatus, and changes the day backward responsive to a manipulation performed on a fast rewind switch included in said voice recording/reproducing apparatus.

\* \* \* \* \*